United States Patent
Minami et al.

(10) Patent No.: US 6,441,864 B1
(45) Date of Patent: Aug. 27, 2002

(54) VIDEO SIGNAL PROCESSING DEVICE AND METHOD EMPLOYING TRANSFORMATION MATRIX TO GENERATE COMPOSITE IMAGE

(75) Inventors: Nobuyuki Minami; Masafumi Kurashige, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/966,915

(22) Filed: Nov. 10, 1997

(30) Foreign Application Priority Data

Nov. 12, 1996 (JP) .............................................. 8-315422

(51) Int. Cl.[7] .............................. H04N 9/74; H04N 9/75
(52) U.S. Cl. ...................... 348/584; 348/586; 348/591; 348/592
(58) Field of Search ................................. 348/584, 585, 348/586, 587, 589, 591, 592, 598, 599; 345/419, 427; H04N 9/74, 9/76, 9/75

(56) References Cited

U.S. PATENT DOCUMENTS

| 4,951,040 A | * | 8/1990 | McNeil et al. .............. 345/427 |
| 5,107,252 A | * | 4/1992 | Traynar et al. ............. 348/580 |
| 5,436,672 A | | 7/1995 | Medioni et al. |
| 5,488,675 A | | 1/1996 | Hanna |
| 6,020,932 A | * | 2/2000 | Kurashige et al. .......... 348/584 |
| 6,124,896 A | * | 9/2000 | Kurashige .................... 348/584 |

FOREIGN PATENT DOCUMENTS

| EP | 0 735 775 | 10/1996 |
| WO | WO 95 10919 | 4/1995 |
| WO | WO 95 25399 | 9/1995 |
| WO | WO 96 05689 | 2/1996 |

* cited by examiner

Primary Examiner—Sherrie Hsia
(74) Attorney, Agent, or Firm—Frommer Lawrence & Haug LLP; William S. Frommer; Glenn F. Savit

(57) ABSTRACT

A video signal processing device includes an address generator to calculate a transformation matrix for three-dimensionally transforming an image to a "blue board" area. The transformation is based on corner positions of the blue board area of a video signal and those of an image area of a source video signal to be inserted. Address information is calculated for reading the source video signal from a memory based on an inverse matrix of the transformation matrix. In this way, the image area to be inserted can be three-dimensionally transformed and automatically inserted into the blue board area, without requiring an operator to input parameters indicative of a post-transformation state.

20 Claims, 13 Drawing Sheets

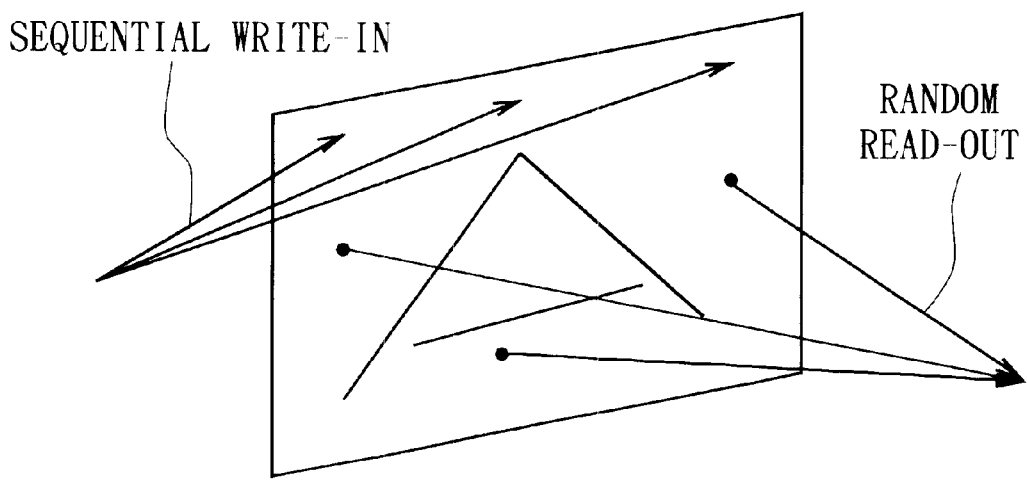
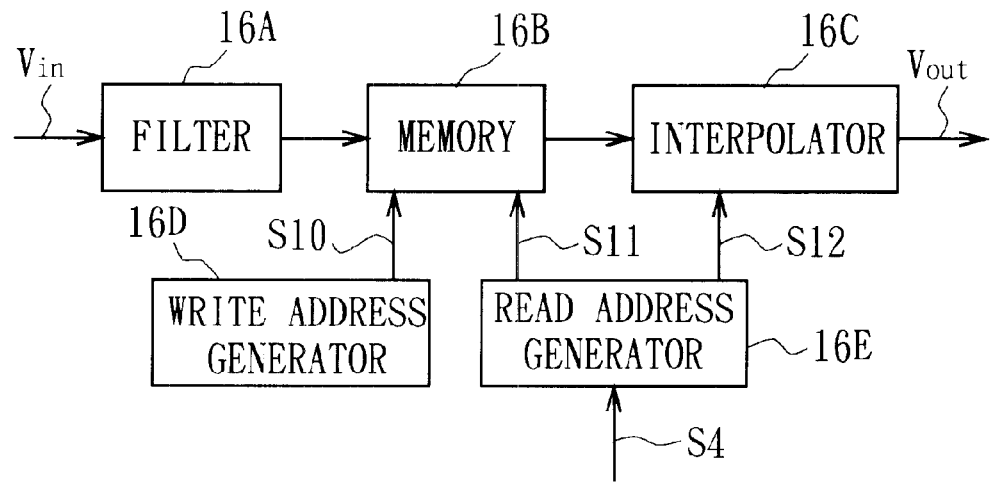
FIG. 9

SOURCE VIDEO SIGNAL V_in

TARGET KEY SIGNAL keyT

SOURCE VIDEO SIGNAL V_out

SOURCE VIDEO SIGNAL V_BK

SOURCE VIDEO SIGNAL V_out

COMPOSITE VIDEO SIGNAL V_mix

VIDEO SIGNAL PROCESSING DEVICE AND METHOD EMPLOYING TRANSFORMATION MATRIX TO GENERATE COMPOSITE IMAGE

BACKGROUND OF THE INVENTION

1. Field of the Invention

The present invention relates to a video signal processing device and a video signal processing method, and is suitably applied to a video signal processing device, for example, a newscaster who is reading aloud the news in the news studio is photographed and the video signal is generated and by inserting the other video signal into that video signal, the image of the other video signal is inserted into the prescribed frame in the background of the newscaster.

2. Description of the Related Art

Heretofore, in the news program production, by inserting the video image matching to the content of the news being read by the newscaster to the prescribed frame in the background of the newscaster, the images matching to the content of that news can be provided to the audience. Thus, the audience can comprehend the content of that news being read aloud by the newscaster more in detail according to the video image to be shown in the background of the newscaster.

Heretofore, these video signal insertion processings have been conducted according to the method to be discussed in the following.

Firstly, a source video signal to show the video image to be inserted to the prescribed frame in the background of the newscaster (heretofore referred to as a source video image) is formed (or reproduced from the VTR) and this is supplied to one end of an input terminal of a mixer through a video effector. At the same time, by photographing the newscaster in the studio, studio video signal is obtained and this is supplied to the other end of the input terminal of the mixer. This mixer combines the source video signal entered in one end of the input terminal and the studio video signal entered in the other end of the input terminal and supplies the resultant composite video signal to a monitor.

An operator supplies parameter for scaling up and down, moving and rotation to a video effector through an input device such as a trackball in order that the outer shape of the source video image fits to the prescribed frame in the background of the newscaster by observing the composite image displayed on the monitor. The video effector conducts the processing of scaling up and down, moving and rotation to the source video image based on the parameter supplied, and supplies the source video signal processed and the key signal showing the shape of the processed source video image to the mixer. The mixer inserts the source video signal into the position shown by this key signal from among studio video signal. The resultant composite video signal is supplied to the monitor as described above and displayed. The operator, repeating the parameter of scaling up and down, moving and rotation till the external shape of the source video image fits to the prescribed frame in the background of the newscaster by observing the composite image to be displayed, supplies to the video effector.

In the case of conventional device, by successively repeating these processings, source video image has been inserted to the prescribed frame in the background of the newscaster.

However, in the conventional insertion processing, the operator has to manually input the parameter necessary for the conversion processing, such as scaling up and down, moving and rotation of the source video image in utilizing the input device such as trackball until the shape of source video image fits to the prescribed frame in the background of the newscaster, and thus, it takes comparatively long time before the shape of source video image completely fits to the prescribed frame in the background of the newscaster and since the operator must conduct an input operation of the parameter during that period, it causes a problem that the operation becomes complicated.

As a method to solve this problem, there is a method disclosed in the U.S. Patent (U.S. Pat. Nos. 4,951,040 and 5,107,252). In this method, the operator inputs at least 4 points of corner position showing the shape after the source video image is converted by using the input means such as touch tablet and stylus. And the image conversion means converts said source video image in order that the corners of the source video image fit to 4 corners specified on the basis of the address signal showing 4 points of corner position entered. According to this method, the source video image can be inserted into the prescribed frame within a comparatively short period of time as compared with the method described earlier and the operator's operation can be decreased.

However, according to this method in the case of inserting the source video image into the prescribed frame in the background of the newscaster, the operator must input corner positions by manually operating the input means such as touch tablet and stylus in order that each corner of the source video image fits to each corner of the prescribed frame in the background of the newscaster, and it is still insufficient on the point to simplify the operation of the operator.

SUMMARY OF THE INVENTION

In view of the foregoing, an object of the present invention is to provide a video signal processing device and a video signal processing method capable of further decreasing the operation task of the operator.

To obviate such problems according to the present invention, we provide a video signal processing device for inserting a source video signal into a predetermined area of a video signal to form a composite video signal, which comprises corner detection means for detecting the blue board area from a video signal formed by imaging an object with a blue board located in the background of the object, and detecting each corner position of the area, source corner specifying means for specifying each corner position of an image area within the source video signal to be inserted into the blue board area in the video signal, address generation means for calculating a transformation matrix for three-dimensionally transforming the image area into the blue board area based on the position information showing each corner position of the blue board detected by the corner detection means and the position information showing each corner position of the image area specified by the source corner specifying means, subsequently calculating an inverse matrix of the transformation matrix, and calculating address information for reading the source video signal from a memory in which the source video signal has been written, image conversion means for writing the source video signal in the memory and reading the source video signal written in the memory based on the address information generated by the address generation means to form a conversion source video signal which has the image area three-dimensionally converted and located at a position corresponding to the blue board area, and signal mixing means for mixing the conversion source video signal and the video signal to form a composite video signal which has the image area of the source video signal inserted into the blue board area in the video signal.

As described above, each corner position of the blue board area is detected from the video signal, and the transformation matrix for three-dimensionally converting the image of the image area so as to be located at a position corresponding to the blue board area is calculated based on the position information showing the detected corner positions and the position information showing each corner position of the image area of the source video signal to be inserted. The address information is generated based on the inverse matrix of the transformation matrix, and the source video signal is read from the memory based on the address information, thereby forming a transformed source video signal having the image area 3-D converted and located at the position corresponding to the blue board area. In this way, when a source video signal is inserted into the prescribed frame of a video signal, an image area to be inserted can be three-dimensionally converted and automatically inserted to the blue board area, which is the destination to which the picture area is inserted, without requiring the operator to input parameters indicative of a state after transformed as before, thereby making it possible to further decrease the operator's operation.

The nature, principle and utility of the invention will become more apparent from the following detailed description when read in conjunction with the accompanying in which like parts are designated by like reference numerals or characters.

BRIEF DESCRIPTION OF THE DRAWINGS

In the accompanying drawings:

FIG. 9 is a block diagram showing the construction of an image transducer;

DETAILED DESCRIPTION OF THE EMBODIMENT

Preferred embodiment of the present invention will be described with reference to the accompanying drawings:

(1) General Construction

Figure 1:
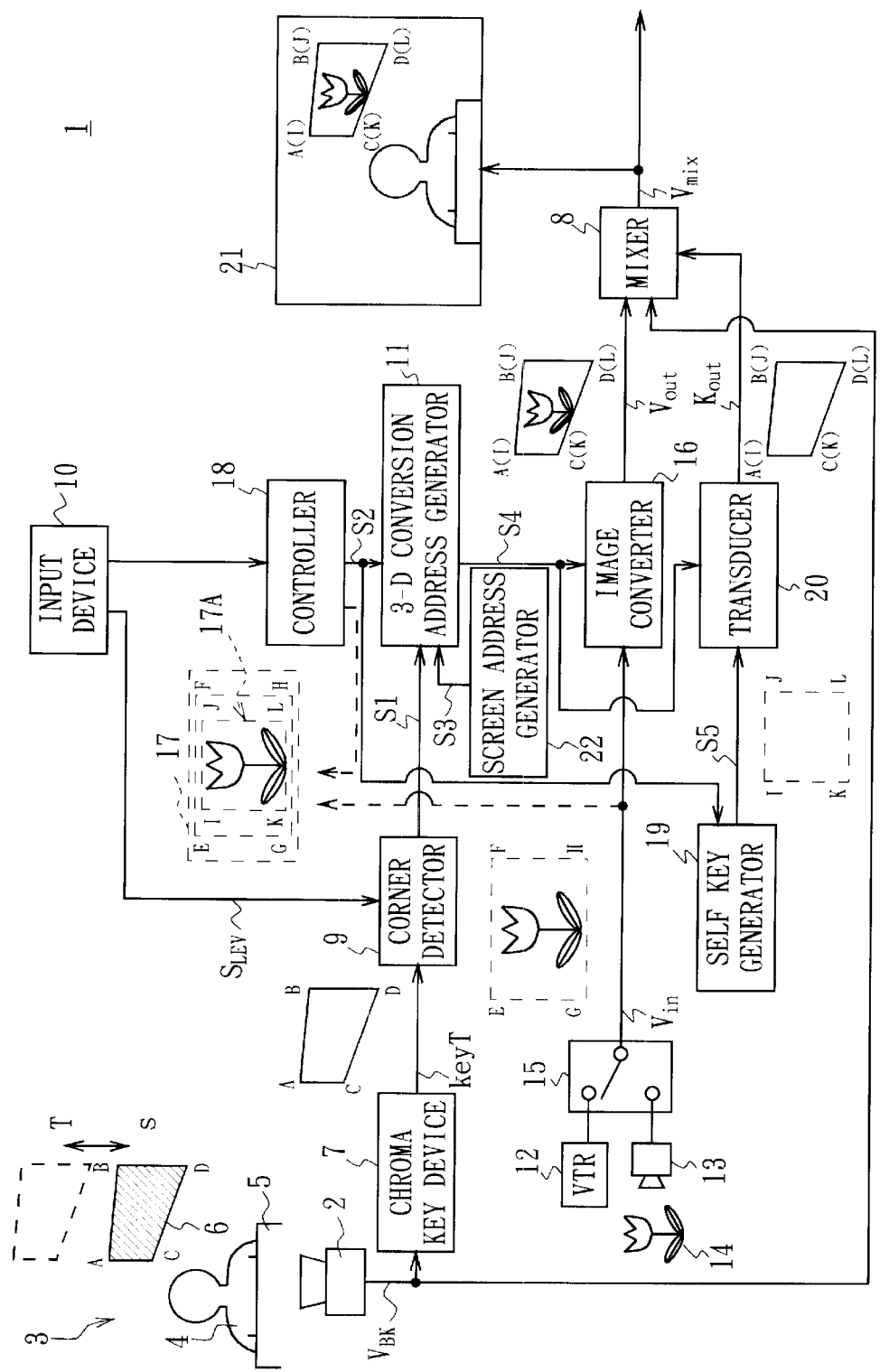
FIG. 1 is a block diagram showing the general construction of a video signal processing device according to one embodiment of the present invention.

In FIG. 1, 1 generally shows a video signal processing device according to the present invention and a studio video signal will be formed by photographing a studio 3 with a video camera 2. In this case, a newscaster 4 is set to read the news text at the position adjacent to a table 5 located in the studio 3. Moreover, a quadrangle ABCD blue board 6 having blue hue is placed in the depth direction slanted behind the newscaster 4. This blue board 6 is placed to show the insertion position of the source video image, and the source video image will be inserted into this blue board 6 by image mixing to be described later. In this connection, in the case of not inserting the source video image, the blue board 6 will be transferred to the position T out of photographic range of the video camera 2 by moving up and down mechanism of the motor.

At the rear of the newscaster 4 and the blue board 6, there is a wall of the studio 3 and the hue of this wall is selected to the hue other than blue so that the blue board 6 can be easily recognized.

The studio 3 arranged in this manner will be photographed by the digital system video camera 2 having CCD as an image pickup device. In this case, the video camera 2 photographs the studio 3 in order that the blue board 6 and the table 5 stay in the screen placing the newscaster 4 in the center of the screen. Digital image signal to be put out by this video camera 2 will be supplied to a chroma key device 7 as a studio video signal $V_{BK}$ and simultaneously supplied to one side of the input terminal of a mixer 8.

Figure 2A:
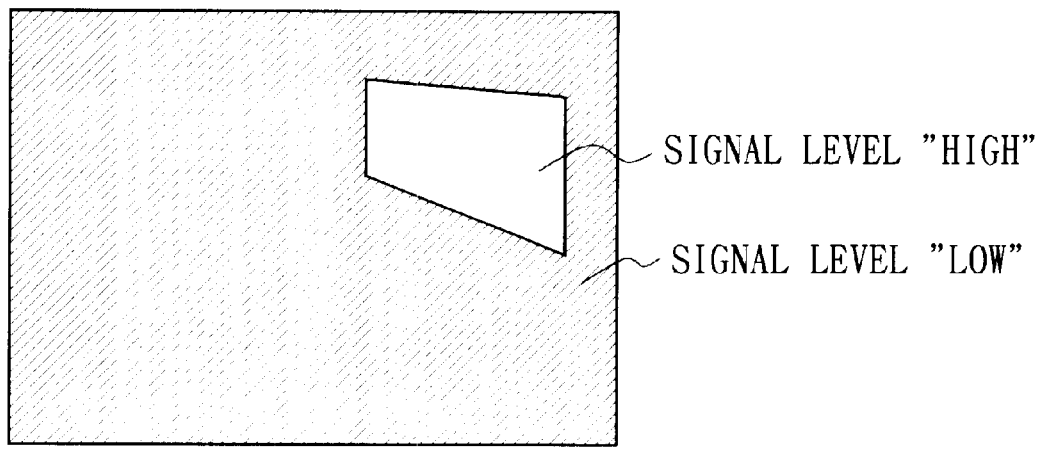
FIGS. 2A and 2B are brief linear diagrams showing images of the target key signal keyT and the studio video signal $V_{BK}$.
Figure 2B:
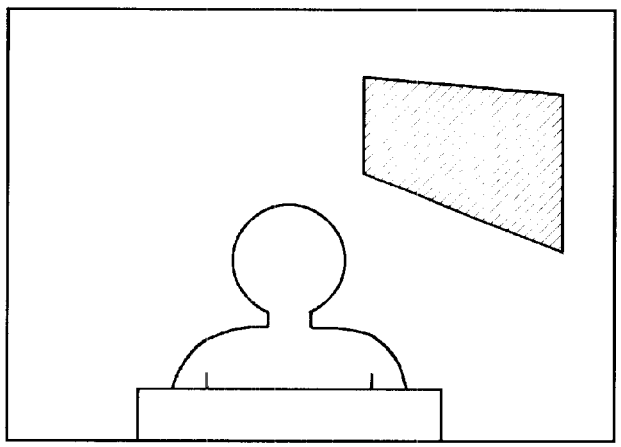

The chroma key device 7 detects image signal having blue hue from the studio video signal $V_{BK}$ supplied and outputs the detection result as a target key signal keyT. This target key signal keyT is the digital signal of 10 bit, and the signal level of the target key signal keyT shown by this digital signal becomes the level corresponding to the hue of the studio video signal. More specifically, in the area of video signal having blue hue, the signal level of the target key signal keyT becomes high, and in the area of video signal having other than blue hue, the signal level of the target key signal keyT becomes low. Accordingly, the shape of the area having "high" signal level agrees with the shape of the blue board 6, and as shown in FIG. 2A, it becomes a quadrangle ABCD as same as the blue board 6. Also, the area of which signal level becomes "high" agrees with the position of the blue board 6 in the studio video signal $V_{BK}$. For reference purposes, the studio video signal will be shown in FIG. 2B.

Accordingly, the target key signal keyT showing the shape and position of the blue board 6 will be supplied to the following corner detector 9.

The corner detector 9 receives reference signal level $S_{LEV}$ entered by the operator using the volume for reference level provided in an input device 10 from said input device 10 and compares said reference signal level $S_{LEV}$ and the signal level of the target key signal keyT supplied from the chroma key device 7. Then, the corner detector 9, detecting the area of which the signal level of the target key signal keyT becomes larger than the reference signal level $S_{LEV}$, detects the blue board 6 area, and detecting positions of 4 corners of that area on the corner display coordinates, generates address signal S1 to show 4 corner positions. This address signal S1 is supplied to the following three-dimensional conversion address generator 11. Here, the display coordinates refers to as coordinates having the horizontal direction of the monitor screen to be x axis and the vertical direction to be y axis, and the perpendicular direction to the monitor screen as z axis.

On the other hand, in the case of this video signal processing device 1, the source video signal to be inserted into the prescribed frame in the background of the newscaster 4 is formed by two methods which will be described as follows. The first method is a method to form the source video signal by reproducing the video signal prerecorded on the magnetic tape by using a video tape recorder (VTR) 12. The second method is a method to form the source video signal by photographing an object 14 using a video camera 13 having a CCD as an image pickup element. Here, the video tape recorder 12 and the video camera 13 are both digital system devices.

Output terminals of the video tape recorder 12 and the video camera 13 are connected to one side of the input terminal of a switch 15 and to the other side of the input terminal. Thus, as the operator switches the switch 15, the desired video signal can be selectively obtained from the source video signal to be formed by two methods. The digital video signal selected by the switch 15 is supplied to an image converter 16 as a source video signal $V_{in}$.

In this connection, the source video signal $V_{in}$ is an image signal of color image system (e.g., NTSC system) having effective image area EFGH as shown in FIG. 1 even in the case where the source video signal $V_{in}$ is formed by either one of above methods.

At this point, in the video signal processing device 1, of the effective image area EFGH of the source video signal $V_{in}$ thus formed, the desired image area is specified and this can be inserted to the prescribed frame (ABCD) placed in the background of the newscaster 4. This image area specification will be described in detail in the following. Provided that in the following description, the image area selected by the operator will be referred to as the selected image area IJKL.

Firstly, the source video signal $V_{in}$ is supplied to the image converter 16 as described above. This source video signal $V_{in}$ is also supplied to a monitor 17. The monitor 17 is a device to show the source video signal $V_{in}$ and displays effective image area EFGH of the source video signal $V_{in}$ on the monitor screen.

Display control signal from a controller 18 is supplied to the monitor 17 and in order that the selected image area IJKL can be visually identified, identification line 17A showing the outer frame of the selected image area IJKL will be displayed on the screen of monitor 17 based on this display control signal. At the time when the operator enters the range specification information in utilizing the range specification volume and a keyboard provided in the input device 10, this identification line 17A changes its size. More specifically, when the operator enters the range specification information using the range specification volume and the keyboard of the input device 10, the controller 18 forms display control signal corresponding to the range specification information and controls the size of the identification line 17A by supplying said display control signal to the monitor 17. With this arrangement, the identification line 17A having the size specified by the operator will be displayed on the screen of the monitor 17. Thus, the operator may operate the range specification volume and the keyboard of the input device 10 by observing the screen displayed on the monitor 17 in order that the desired area to be inserted as the source video image would be surrounded by the identification line 17A.

Figure 3A:
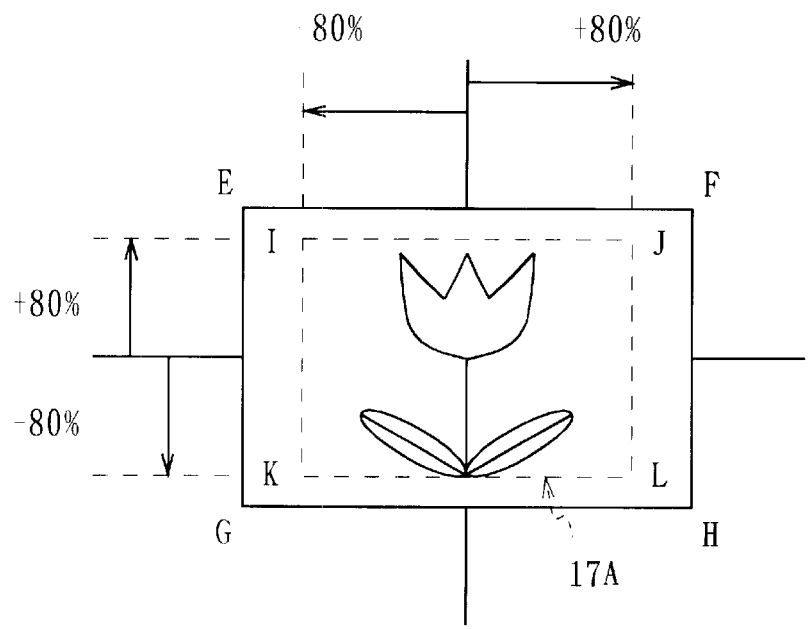
FIGS. 3A and 3B are brief linear diagrams illustrating the range specification of the selected image area.

At this point, the range specification will be described more specifically. As described above, the operator operates the range specification volume and the keyboard of the input device 10 observing the source video image to be displayed on the monitor 17 and enters the range specification information, i.e., which range of the effective image area EFGH would be selected as the selected image area IJKL. In this case, the operator enters the range specification information in the horizontal direction and the vertical direction making the center of effective image area EFGH of the source video signal $V_{in}$ as reference. For example, if the operator enters plus 80 percent and minus 80 percent from the center of the effective image area EFGH as the range specification information in the horizontal direction and if the operator enters plus 80 percent and minus 80 percent from the center of the effective image area EFGH as the range specification information in the vertical direction, and an identification line 17A will be displayed on the position as shown in FIG. 3A. More specifically, the vertical line of the identification line 17A is displayed on the position shifted plus 80 percent and minus 80 percent in the horizontal direction from the center of the effective image area EFGH and the horizontal line of the identification line 17A is displayed on the position shifted plus 80 percent and minus 80 percent in the vertical direction. In this case, the image area surrounded by the identification line 17A thus displayed is specified as the selected image area IJKL.

Figure 3B:
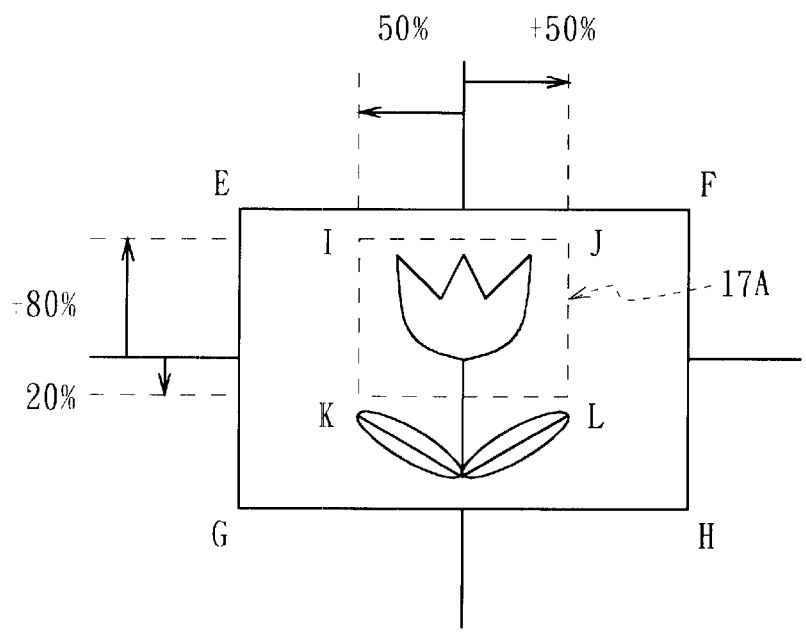

Furthermore, for example, if the operator enters plus 50 percent and minus 50 percent from the center of the effective image area EFGH as the range specification information in the horizontal direction and plus 80 percent and minus 20 percent as the range specification information in the vertical direction, the identification line 17A will be displayed on the position as shown in FIG. 3B. More specifically, a vertical line of the identification line 17A is displayed on the position shifted plus 50 percent and minus 50 percent in the horizontal direction from the center of the effective image area EFGH and a horizontal line of the identification line 17A is displayed on the position shifted plus 80 percent and minus 20 percent in the vertical direction from the center of the effective image area EFGH. In this case, the image area surrounded by the identification line 17A thus displayed is specified as the selected image area IJKL.

As the range specification information in the horizontal direction, if plus 100 percent and minus 100 percent are entered from the center of the effective image area EFGH, and as the range specification information in the vertical direction, if plus 100 percent and minus 100 percent are entered from the center of the effective image area EFGH, the specification line 17A lies on the contour of the effective image area EFGH and this means that the effective image area EFGH itself is specified as the selected image area IJKL. In this connection, since the default value of the specification line 17A is set to plus 100 percent and minus 100 percent both in the horizontal and vertical directions, the effective image area EFGH is specified as the selected image area IJKL if the operator does not operate the range specification volume and the keyboard of the input device 10.

At this point, returning to FIG. 1, an explanation on this FIG. 1 will be continued. When the operator completes the specification of the selected image area IJKL, the controller 18 detects 4 corner positions of the selected image area IJKL specified based on the range specification information from the input device 10 and generates an address signal S2 to show the position on the display coordinates of 4 corners. If the operator does not conduct the range specification as described above, it generates the address signal S2 showing positions of 4 corners of the effective image area EFGH, that is the default value. This address signal S2 will be supplied to a three dimensional conversion address generator 11 and a self key generator 19 respectively. As it is clear from this explanation, the controller 18 comprises the source corner specification circuit to specify each corner position of image area in which studio video signal $V_{BK}$ is inserted to the three-dimensional conversion address generator 11 to be described in the following paragraphs.

As described above, the address signal S1 showing 4 corner positions of the quadrangle ABCD showing the blue board 6 supplied from the corner detector 9 and the address signal S2 showing 4 corner positions of the selected image area IJKL supplied from the controller 18 are supplied to the three-dimensional conversion address generator 11. Furthermore, screen address signal S3 formed by the screen address generator 22 is supplied into this three-dimensional conversion address generator 11. This screen address signal S3 is a signal showing the address on the monitor screen of the monitor 21 to be described later. The screen address generator 22 is equipped with a reference clock generator corresponding to pixel frequency inside, and on the basis of the reference clock generated by said reference clock generator, generates screen address on the monitor 21 in a raster scanning order and outputs this as the screen address signal S3.

The three-dimensional address generator 1 calculates the conversion address which converts the selected image area IJKL to the same shape as the quadrangle ABCD based on the address signal S1 showing 4 corner positions of the quadrangle ABCD showing the blue board 6 supplied from the corner detector 9 and the address signal S2 showing 4 corner positions of the selected image area IJKL supplied from the controller 18.

More specifically, the three-dimensional address generator 11 calculates the transformation matrix in order that the selected image area IJKL which is applied the natural perspective conversion processing, is inserted to the quadrangle ABCD based on the address signal S1 to show 4 corner positions of the quadrangle ABCD and the address signal S2 to show the 4 corner positions of the selected image area IJKL. Then, the three-dimensional address generator 11 calculates the inverse matrix of that transformation matrix and calculates conversion address by successively multiplying said inverse matrix to the screen address obtained by the screen address signal S3. This conversion address will be supplied to the image converter 16 as a conversion address signal s4.

The image converter 16 is comprised of field memory and writes the source video signal $V_{in}$ to be entered in the field memory. Moreover, the image converter 16, by reading the source video signal $V_{in}$ from the position in the field memory to be specified by the conversion address signal S4 supplied from the three-dimensional conversion address generator 11, forms source video signal VOUt in which its selected image area IJKL as a source video image is converted to the quadrangle ABCD having the same shape as the blue board 6. In this connection, since the conversion address is formed on the basis of the screen address formed in a raster scanning order, there are cases where the conversion address shows the position not existing in the field memory. In that case, the image converter 11 does not conduct the read operation of the source video signal $V_{in}$.

Figure 4:
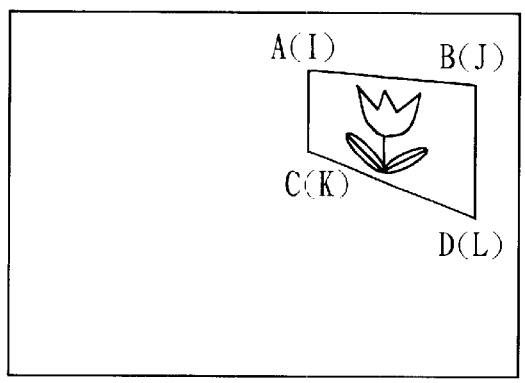
FIG. 4 is a brief linear diagram showing an image of the source video signal $V_{out}$.

With this arrangement, the source video signal $V_{out}$ thus formed, as shown in FIG. 4, in which the selected image area IJKL is the source video image, is transformed to the same shape as the quadrangle ABCD showing the blue board 6, and is a video signal coordinate transformed to the position of that quadrangle ABCD. As it is clear from this FIG. 4, the relationship between the selected image area EFGH and the quadrangle ABCD is so arranged that corners E, F, G and H of the selected image area correspond to corners A, B, C and D of the quadrangle respectively.

The source video signal $V_{out}$ thus formed will be supplied to the other side of the input terminal of the mixer 8.

Figure 5:
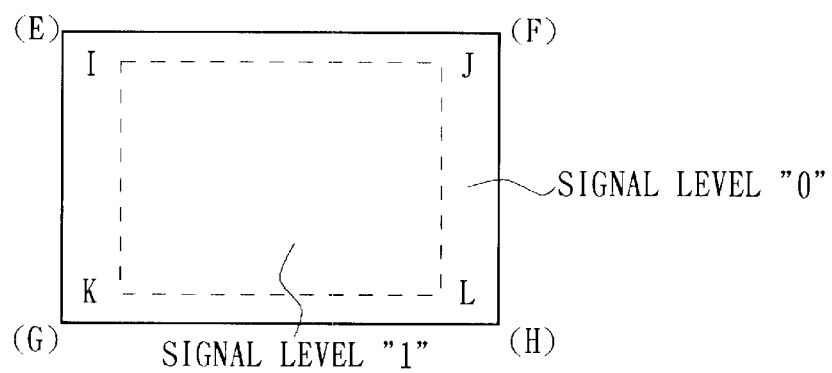
FIG. 5 is a brief linear diagram showing an image of the self key signal S5.

The self key generator 19 generates self key signal S5 in which an area having the signal level "1" becomes the same shape as the selected image area IJKL and outputs this to a key signal converter 20 on the basis of the address signal S2 showing 4 corner positions of the selected image area IJKL supplied from the controller 18. As it is clear from this FIG. 5, the size of whole area shown by the self key signal S5 corresponds to the effective image area EFGH.

Basically, the key signal converter 20 has the construction similar to that of the image converter 16, and sequentially writes the self key signal S5 to be entered in the field memory. Moreover, the key signal converter 20, by reading out the self key signal S5 from the position in the field memory to be specified by the conversion address signal S4 supplied from the three-dimensional conversion address generator 11, forms self key signal $K_{out}$ in which the area with the signal level "1" is converted to the quadrangle ABCD having the same shape as the blue board 6. Also in the case of this converter 11, if the conversion address shows the position not existing in the field memory, the read operation of the self key signal S5 would not be conducted.

Figure 6:
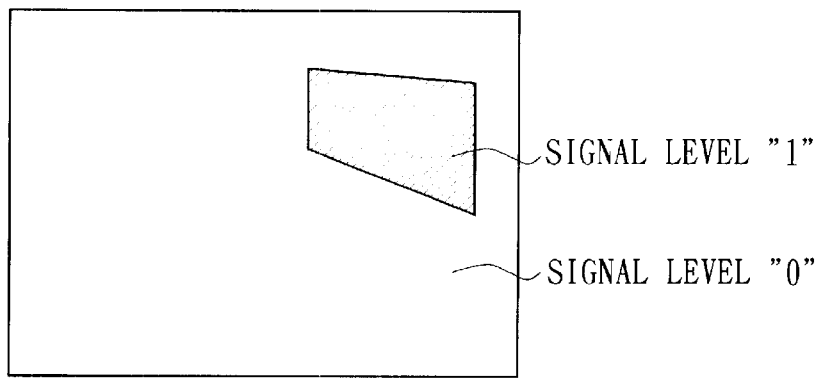
FIG. 6 is a brief linear diagram showing an image of the self key signal $K_{out}$.

As shown in FIG. 6, thus formed self key signal $K_{out}$ is the signal in which the area with the signal level "1" is converted to the same shape as the quadrangle ABCD showing the blue board 6, and the coordinate transformed to the position of that quadrangle ABCD.

Thus formed self key signal $K_{out}$ will be supplied to the key input terminal of the following mixer 8.

The mixer 8 combines the source video signal $V_{out}$ supplied from the image converter 16 and the studio video signal $V_{BK}$ supplied from the video camera 2 on the basis of the self key signal $K_{out}$ supplied to the key signal input terminal. More specifically, the mixer 8 outputs the studio video signal $V_{BK}$ supplied from the video camera 2 at the time when the signal level of the self key signal $K_{out}$ is "0", and outputs the source video signal $V_{out}$ supplied from the image converter 16 when the signal level of the self key signal $K_{out}$ is "1". Thus, the mixed video signal $V_{mix}$ in which the source video signal $V_{out}$ is inserted to the blue board 6 area of the studio video signal $V_{BK}$ is formed. This mixed video signal $V_{mix}$ as well as being supplied to the outside broadcasting facilities, is supplied to the monitor 21.

When the mixed video signal $V_{mix}$ thus formed is displayed on the monitor 21, the mixed video screen in which the source video image IJKL is inserted into the prescribed frame ABCD in the background of the newscaster 4 will be displayed on this monitor 21.

Figure 7:
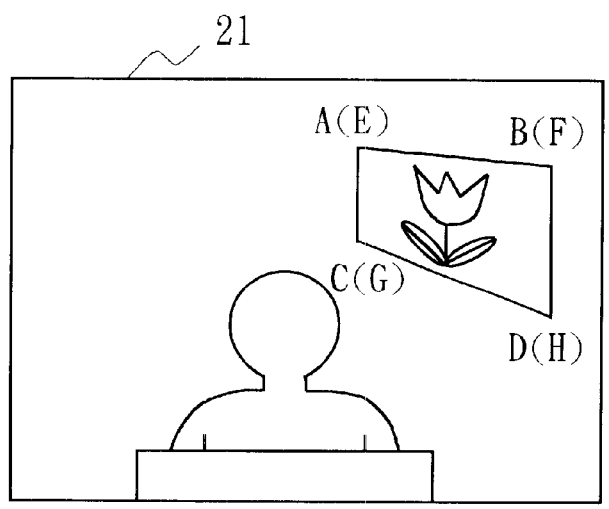
FIG. 7 is a brief linear diagram showing an image of the composite video signal $V_{mix}$ when the whole effective image area EFGH is specified as the selected image area IJKL.

In this connection, in the case where the whole area of effective image area EFGH is specified as the selected image area IJKL, as shown in FIG. 7, the mixed video screen in which the whole area of effective image area EFGH is inserted to the prescribed frame ABCD in the background of the newscaster 4 will be displayed.

Figure 8:
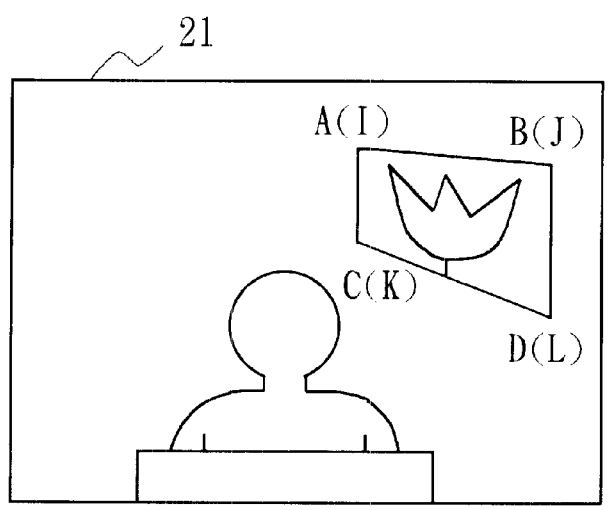
FIG. 8 is a brief linear diagram showing an image of the composite video signal $V_{mix}$ when a part of effective image area EFGH is specified as the selected image area IJKL.

Furthermore, in the case where a part of effective image area EFGH (i.e., only flower part) is specified as the selected image area IJKL as shown in FIG. 3B, the mixed video screen in which only specified part is inserted to the prescribed frame ABCD in the background of the newscaster 4 will be displayed as shown in FIG. 8. As it is clear from this FIG. 8, in the case where only a part of the effective image area EFGH is specified, that specified part will be displayed enlarged.

(2) Construction of Image Converter

In this chapter the construction of the image converter 16 described above will be explained more specifically. As shown in FIG. 9, the image converter 16 comprises a filter 16A, a memory 16B, an interpolator 16C, a write address generator 16D and a read address generator 16E. The source video signal $V_{in}$ supplied from a switch 15 is firstly supplied to the filter 16A. This filter 16A is to control the occurrence of aliasing and provides the band control in the horizontal and vertical directions to the source video signal $V_{in}$ to be entered, and supplies the resultant band controlled source video signal $V_{in}$ to the memory 16B.

This memory 16B is comprised of three field memories. Of 3 field memories, one is constantly controlled in a writable state, and the remaining two are controlled in readable states. In these cases, the field memories to be controlled in writable states and readable states will be sequentially shifted in a field cycle. For example, at first, if the first field memory is in a writable state and the second and the third field memories are in readable states, at the following field timing, the second field memory is controlled in the writable state and the third and the first field memories are controlled in the readable states. Furthermore, at the following field timing, the third field memory is controlled in the writable state and the first and the second field memories are controlled in the readable states. Since the writable condition and readable condition of 3 field memories will be shifted in a field cycle, the conversion processing to be described in the following paragraph can be conducted in real time.

When the source video signal $V_{in}$ is entered, the memory 16B sequentially writes the source video signal $V_{in}$ in the field memory which is in a writable state on the basis of sequential write address signal S10 to be supplied from the write address generator 16D. The write address generator 16D has a reference clock generator corresponding to the pixel frequency of the source video signal $V_{in}$ inside and generates sequential address signal S10 on the basis of the reference clock generated in that reference clock generator.

Moreover, paralleling this write operation, the memory 16B successively reads the source video signal $V_{in}$ from 2 field memories which are in a readable state on the basis of read address signal S11 to be supplied from the read address generator 16E. This source video signal read out will be supplied to the following interpolator 16C.

At this point, the read address generator 16E forms read address signal S11 on the basis of the conversion address signal S4 supplied from the three-dimensional conversion address generator 11. In this case, the read address generator 16E takes out an integer part of the conversion address to be obtained by the conversion address signal S4 as the read address and supplies that read address to the memory 16B as an address signal S11. If the read address pulled out is the address not existing in the memory 16B, the read address signal S11 would not be produced and the read operation stops as described above.

Furthermore, the read address generator 16E takes out a decimal part of the conversion address to be obtained by the conversion address signal S4 and on the basis of that decimal part, forms an interpolation coefficient for use in the interpolator 16C. This interpolation coefficient will be supplied to the interpolator 16C as an interpolation coefficient signal S12.

The interpolator 16C performs the interpolation processing on the source video signal read out from the memory 16B and it provides the interpolation processing to the source video signal read out based on the interpolation coefficient to be obtained from the interpolation coefficient signal S12. The reason that the interpolator 16C is provided here is as follows: Since the conversion address to be supplied from the three-dimensional conversion address generator 11 is not always the integer but it contains the decimal sometimes. Accordingly, if the conversion address contains the decimal, read operation cannot be conducted since the decimal address does not exist in the memory 16B. Therefore, the conversion address is divided into the integer part and the decimal part, and in the case where the conversion address contains decimals, the video data read out by the integer part is interpolation processed and the video data corresponding to the decimal part is obtained. Thus, in the case where the conversion address contains the decimal, the video data corresponding to that conversion address can be obtained.

Thus, by reading out the source video signal from the memory 16C corresponding to the integer part of the conversion address and providing the interpolation processing onto the source video signal read out corresponding to the decimal part of the conversion address, as shown in FIG. 4, the source video image part is transformed to the same shape as the quadrangle ABCD showing the blue board 6 and the coordinate converted source video signal $V_{out}$ is formed on the position of that quadrangle ABCD. This source video signal $V_{out}$ will be supplied to the mixer 8 as described above.

In this connection, we have described so far that a set of filter 16A, memory 16B and interpolator 16C is provided. However, in practice, 2 sets of filter 16A, memory 16B and interpolator 16C are provided corresponding to the brightness signal and color difference signal of the source video signal $V_{in}$. More specifically, in this image converter 16, the conversion processing of brightness signal of the source video signal $V_{in}$ is conducted in one of 2 sets and the conversion processing of color difference signal of the source video signal $V_{in}$ will be conducted in the other set.

(3) Conversion Address Generating Method of 3-D Conversion Address Generator

In this chapter the conversion address generation method in a three-dimensional conversion address generator 11 will be described. In the case of inserting the source video signal $V_{in}$ into the quadrangle ABCD shown by the blue board 6, the source video signal $V_{in}$ is mapped in the three-dimensional space and it should be further inserted to the quadrangle ABCD after being focused onto the monitor screen making the operator's visional point as a datum point. The reason is that the blue board 6 exists in the three-dimensional space and the quadrangle ABCD is an image which a blue board 6 existing in the three-dimensional space is focused on the monitor screen making the operator's visional point as a datum point. Accordingly, in the three-dimensional conversion address generator 11, the transformation matrix including the image mapping to the three-dimensional space and throwing it on the two-dimensional plane from the three-dimensional space should be calculated and by calculating the inverse matrix of that transformation matrix, conversion address should be formed. More specific explanation will be given on this point in the following chapters.

(3-1) Definition of Coordinate System

Figure 10A:
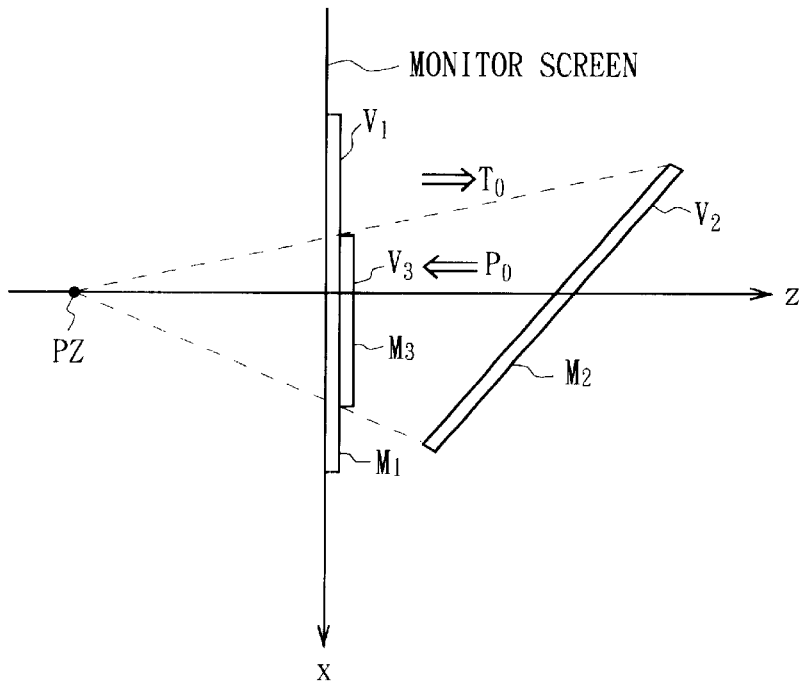
FIGS. 10A and 10B are brief linear diagrams illustrating the principle of the 3-D image conversion processing.
Figure 10B:
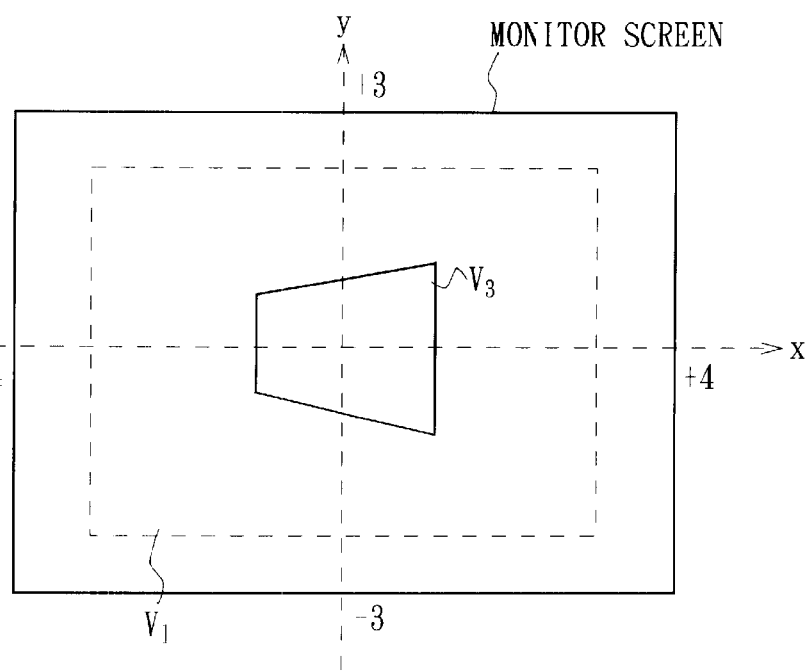

Firstly, the coordinate system of three-dimensional space will be described with reference to FIGS. 10A and 10B. The three-dimensional coordinate system being used in this embodiment is defined, as shown in FIGS. 10A and 10B, according to the xyz orthogonal coordinates making the center of the monitor screen as an original point, and horizontal direction of the monitor screen to be x axis, vertical direction of the monitor screen to be y axis, and in the direction perpendicular to the monitor screen to be z axis. In this case, regarding x axis, right direction of the monitor screen is taken to be plus direction and left direction of the monitor screen is taken to be minus direction, and as to y axis, upper direction of the monitor screen is taken as plus direction and lower direction of the monitor screen is taken to be minus direction, and as to z axis, depth direction of the screen is taken to be plus direction and this side of the screen (i.e., the side where the operator's visional point exists) as minus direction.

Furthermore, as regards to the x-axis direction in the screen area, virtual coordinate values between −4 and +4 are set, and as to the y axis direction in the screen area, virtual coordinate values between −3 and +3 are set. Of course, virtual coordinate values are set in the outside of the screen area. Moreover, regarding the operator's visional point PZ, it is virtually set at the point z coordinate on z axis is "−16".

(3-2) Basic Algorithm of 3-dimentional Image Transformation

Next, at this point, a method for forming the video signal in which the source video signal $V_{in}$ is 3-dimensional image transformation processed (i.e., image mapping in the 3-D space and image focusing on the monitor screen from the 3-D space) will be described.

Firstly, the source video signal $V_{in}$ is stored in the memory 16B in the image converter 16 as it is without being given any three-dimensional processing. Since this source video signal $V_{in}$ is two-dimensional video signal, as shown in FIG. 10A this is a video signal $V_1$ existing at the position $M_1$ on the monitor screen in the three-dimensional space.

This source video signal $V_{in}$ should be coordinate transformed to the position of blue board 6 which exists in the three-dimensional space as described above. Here, as shown in FIG. 10A, supposing that the blue board 6 exists on the position $M_2$, slanted about 45-degree with respect to the screen surface in the plus direction of z axis. If the blue board 6 exists on such a position $M_2$, parallel transfer in the plus direction of z axis, and approximately 45-degree rotation processing about y axis must be conducted to the source video signal $V_{in}$. These coordinate transformation processing can be executed using a three-dimensional transformation matrix $T_0$. More specifically, by multiplying the three-dimensional transformation matrix $T_0$ by each pixel of the source video signal $V_{in}$, video signal $V_2$ in the three-dimensional space can be formed.

In general, this 3-D transformation matrix $T_0$ can be expressed by the following equation:

$$T_0 = \begin{bmatrix} r_{11} & r_{12} & r_{13} & 0 \\ r_{21} & r_{22} & r_{23} & 0 \\ r_{31} & r_{32} & r_{33} & 0 \\ 1_x & 1_y & 1_z & s \end{bmatrix} \quad (1)$$

The transformation parameters $r_{11}$–$r_{33}$ to be used in this three-dimensional transformation matrix To are parameters containing elements to rotate the source video signal $V_{in}$ about the x axis, y-axis and z-axis respectively, to scale up and down the source video signal $V_{in}$ in the x-axis direction, in the y-axis direction and in the z-axis direction respectively, and the element to skew the source video signal $V_{in}$ in the x-axis direction, in the y-axis direction and in the z-axis direction respectively. Moreover, the transformation parameters $1_x$, $1_y$, $1_z$ are the parameters containing elements to move the source video signal $V_{in}$ parallel in the direction of x-axis, y-axis and z-axis, and the transformation parameter s is the parameter containing the element to scale up and down the source video signal $V_{in}$ in the respective axis direction of 3-dimension.

In this connection, since this transformation matrix $T_0$ expresses the coordinate system of rotation transformation and the coordinate system of parallel transfer transformation and scaling up and down transformation in the same one coordinate system, it becomes a 4-row 4-column matrix. In general, such coordinate system is called as Homogeneous Coordinate.

Since the video signal $V_2$ coordinate transformed in the three-dimensional space using the 3-dimensional transformation matrix is put in the quadrangle ABCD in the studio video signal $V_{BK}$, image focus processing on the monitor screen making the operator's visional point as a datum point should be conducted. More specifically, as shown in FIG. 10A, when video signal $V_2$ on the position $M_2$ in the 3-dimensional space is viewed from the virtual visional point PZ on the z-axis, video signal $V_3$ to be seen through on the xy plane must be obtained. This image focus processing can be executed by using a perspective transformation matrix PO. More specifically, by multiplying the perspective transformation matrix $P_0$ by each pixel of the video signal $V_2$, the video signal $V_2$ existing in the 3-dimensional space can be obtained as the video signal $V_3$ seen through on the xy plane.

In general, this perspective transformation matrix $P_0$ can be expressed as follows:

$$P_0 = \begin{bmatrix} 1 & 0 & 0 & 0 \\ 0 & 1 & 0 & 0 \\ 0 & 0 & 0 & P_z \\ 0 & 0 & 0 & 1 \end{bmatrix} \quad (2)$$

The parameter $P_z$ of this perspective transformation matrix $P_0$ is a perspective value for applying the perspective law when the video signal $V_2$ is seen through on the xy plane. Generally, this perspective value $P_z$ is set on "1/16" as the reference value. This means that the value of z coordinate of the virtual visional point PZ is "−16", and this perspective value $P_z$ can be changed to the value by the operator's setting.

Thus, by conducting the coordinate transformation to the 3-dimensional space and the image focus processing on the source video signal $V_{in}$, it becomes possible that the source video signal $V_{in}$ can be fit in the quadrangle ABCD in the studio video signal $V_{in}$.

The contents of the transformation processing described above may be summarized as follows: The transformation processing is composed of a spatial image transforming step, that is the step till the 3-dimensional conversion video signal $V_2$ is obtained from the source video signal $V_{in}$ ($V_1$) by the 3-dimensional transformation matrix $T_0$, and a perspective transforming step, that is the step till the perspective conversion video signal $V_3$ is obtained from the 3-dimensional transform video signal $V_2$ by the perspective transformation matrix $P_0$. Accordingly, the transformation matrix T to obtain the perspective transform video signal $V_3$ from the source video signal $V_{in}$ ($V_1$) can be expressed by the following equation by multiplying the 3-dimensional transformation matrix $T_0$ by the perspective transformation matrix $P_0$.

$$T_0 = T_0 \cdot P_0 = \begin{bmatrix} r_{11} & r_{12} & r_{13} & 0 \\ r_{21} & r_{22} & r_{23} & 0 \\ r_{31} & r_{32} & r_{33} & 0 \\ 1_x & 1_y & 1_z & s \end{bmatrix} \begin{bmatrix} 1 & 0 & 0 & 0 \\ 0 & 1 & 0 & 0 \\ 0 & 0 & 0 & P_z \\ 0 & 0 & 0 & 1 \end{bmatrix} \quad (3)$$

$$= \begin{bmatrix} r_{11} & r_{12} & r_{13} & r_{13}P_z \\ r_{21} & r_{22} & r_{23} & r_{23}P_z \\ r_{31} & r_{32} & r_{33} & r_{33}P_z \\ 1_x & 1_y & 1_z & 1_zP_z+s \end{bmatrix}$$

Accordingly, by multiplying the transformation matrix $T_0$ shown in this equation (3) by each pixel of the source video signal $V_{in}$ the source video signal $V_{out}$ which can be inserted into the studio video signal $V_{BK}$ can be formed.

In this video signal processing device 1, in the case of forming the source video signal $V_{out}$, the transformation matrix $P_0$ is not multiplied by the source video signal $V_{in}$, but in practice, by obtaining the read address on which the image transformation shown by the transformation matrix $T_0$ will be applied, the source video signal $V_{out}$ will be formed by reading the source video signal from the memory 16B of the image converter 16 based on that read address.

More specifically, in this video signal processing device 1, the source video signal $V_{in}$ is sequentially written in the memory 16B of the image converter 16, and by reading out that source video signal $V_{in}$ on the basis of read address on which image transformation shown by the transformation matrix $T_0$ will be provided, the source video signal $V_{out}$ which can be inserted to the studio video signal $V_{BK}$ will be formed.

The source video signal $V_{in}$ to be written in the memory 16B and the source video signal $V_{out}$ to be read out from the memory 16B are both two-dimensional video data and also the memory 16B is a memory to store the two-dimensional data. Accordingly, in the read address calculation for use of read operation from the memory 16B, practically the parameter for calculating the data of three-dimensional space in the z-axis direction will not be used. Accordingly, of the transformation matrix T shown in the equation (3), parameters of the third row and the third column for calculating the data in the z-axis direction become unnecessary.

More specifically, where the transformation matrix having the parameter actually required for the read address calculation to be $T_{33}$, the transformation matrix $T_{33}$ becomes the matrix exclusive of the third row and the third column of the equation (3) and can be expressed as follows:

$$T_{33} = \begin{bmatrix} r_{11} & r_{12} & r_{13}P_z \\ r_{21} & r_{22} & r_{23}P_z \\ 1_x & 1_y & 1_zP_z+s \end{bmatrix} \quad (4)$$

Figure 11:
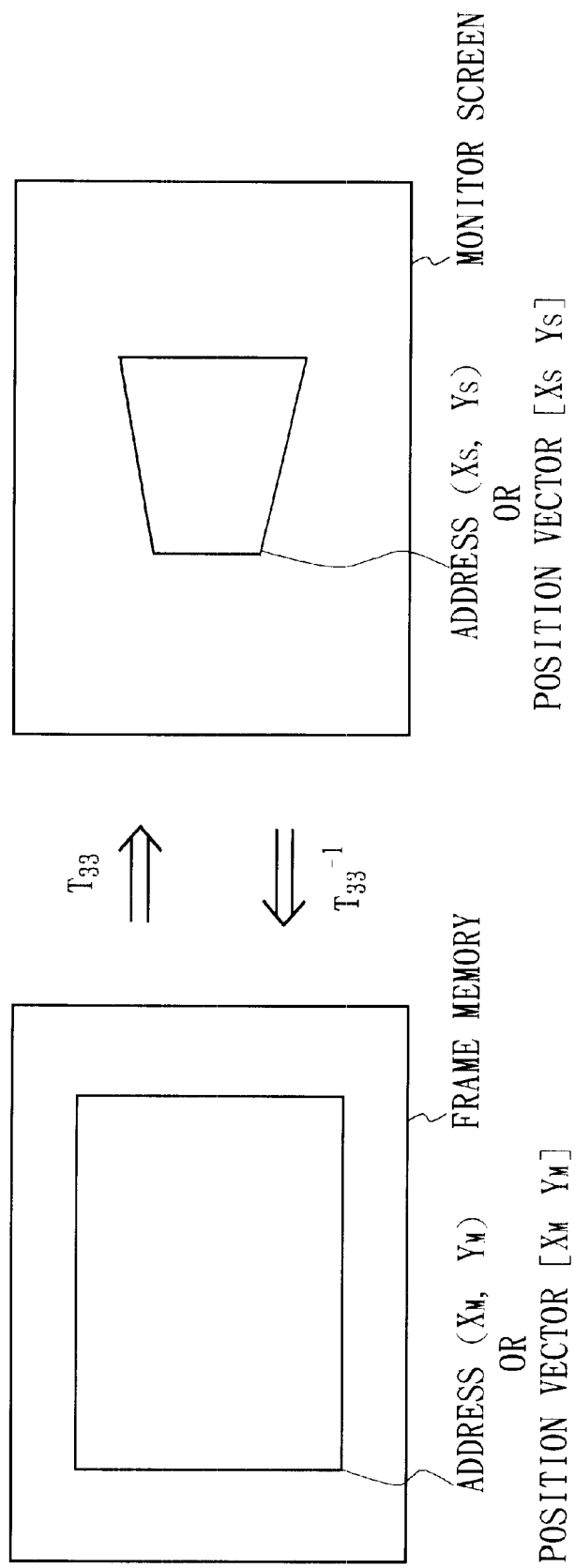
FIG. 11 is a brief linear diagram illustrating the correlation of position vectors between a memory and a monitor screen.

Then, the read address calculation method to be used for the read operation of the source video signal from the memory 16B will be explained. At first, referring to FIG. 11, the relation between the position vector on the memory 16B and the position vector on the monitor screen will be explained. For the sake of clarity, we will deal the matter supposing that two field memories in the memory 16B which are in the readable state are as one field memory.

Firstly, let the two-dimensional address on the frame memory to be $(X_M, Y_M)$ and the position vector to be $[X_M\ Y_M]$, address on the monitor screen to be $(X_S, Y_S)$ and the position vector to be $[X_S\ Y_S]$. Then, if this two-dimensional position vector $[X_M\ Y_M]$ on the frame memory is expressed by the homogeneous coordinate, it can be expressed as vector $[x_m\ y_m\ H_0]$ and the position vector $[X_S\ Y_S]$ on the monitor screen can be expressed as vector $[x_s\ y_s\ 1]$. The parameter "$H_0$" of this homogeneous coordinate system is the parameter to show the magnitude of the vector.

By applying the transformation matrix $T_{33}$ to the position vector $[x_m\ y_m\ H_0]$ on the frame memory, the position vector $[x_m\ y_m\ H_0]$ will be transformed to the position vector $[x_s\ y_s\ 1]$ on the monitor screen. Thus, the relationship between the position vector $[x_m\ y_m\ H_0]$ on the frame memory and the position vector $[x_s\ y_s\ 1]$ on the monitor screen can be expressed by the following equation:

$$[x_s y_s 1] = [x_m y_m H_0] \cdot T_{33} \quad (5)$$

The relation between the parameter "$H_0$" of the homogeneous coordinate used in the position vector $[x_m\ y_m\ H_0]$ on the frame memory and the parameter "1" of the homogeneous coordinate system used in the position vector $[x_s\ y_s\ 1]$ on the monitor screen is that the position vector $[x_m\ y_m]$ on the frame memory is transformed to the position vector $[x_s\ y_s]$ on the screen by the transformation matrix $T_{33}$ and the magnitude "$H_0$" of the position vector $[x_m\ y_m]$ on the frame memory is transformed so that the magnitude of the position vector $[x_s\ y_s]$ on the monitor screen becomes "1".

In the device like this video signal processing device 1 which provides the spatial transformation processing to the source video signal $V_{in}$ by supplying the read address corresponding to the transformation matrix $T_{33}$ to the frame memory, it is necessary to obtain the point on the frame memory corresponding to the point on the monitor screen, not obtaining the point on the monitor screen corresponding to the point on the frame memory. More specifically, as shown in the following equation transformed from the equation (5), the position vectors $[x_m\ y_m\ H_0]$ on the frame memory should be calculated using the inverse matrix $T_{33}^{-1}$ of the transformation matrix $T_{33}$ with respect to the position vectors $[x_s\ y_s\ 1]$ on the monitor screen.

$$[x_m y_m H_0] = [x_s y_s 1] \cdot T_{33}^{-1} \quad (6)$$

Then, based on this principle, the method actually to obtain the 2-D position vectors $[X_M\ Y_M]$ on the frame memory will be explained below. Firstly, the transformation matrix $T_{33}$ is expressed by parameters $a_{11}$–$a_{33}$ as shown in the following equation:

$$T_{33} = \begin{bmatrix} r_{11} & r_{12} & r_{13}P_z \\ r_{21} & r_{22} & r_{23}P_z \\ 1_x & 1_y & 1_zP_z+s \end{bmatrix} = \begin{bmatrix} a_{11} & a_{12} & a_{13} \\ a_{21} & a_{22} & a_{23} \\ a_{31} & a_{32} & a_{33} \end{bmatrix} \quad (7)$$

And the inverse matrix $T_{33}^{-1}$ will be expressed by the parameters $b_{11}$–$b_{33}$ as shown in the following equation:

$$T_{33}^{-1} = \begin{bmatrix} a_{11} & a_{12} & a_{13} \\ a_{21} & a_{22} & a_{23} \\ a_{31} & a_{32} & a_{33} \end{bmatrix}^{-1} = \begin{bmatrix} b_{11} & b_{12} & b_{13} \\ b_{21} & b_{22} & b_{23} \\ b_{31} & b_{32} & b_{33} \end{bmatrix} \quad (8)$$

$$\text{provided that, } b_{ij} = \frac{a_{ji}}{\det(T_{33})}$$

The inverse matrix $T_{33}^{-1}$ thus defined will be substituted into the equation (6) described above and by expanding this, the following equation will be obtained.

$$[x_m \ y_m \ H_0] = [x_s \ y_s \ 1] \begin{bmatrix} b_{11} & b_{12} & b_{13} \\ b_{21} & b_{22} & b_{23} \\ b_{31} & b_{32} & b_{33} \end{bmatrix} = \begin{bmatrix} b_{11}x_s + b_{21}y_s + b_{31} \\ b_{12}x_s + b_{22}y_s + b_{32} \\ b_{13}x_s + b_{23}y_s + b_{33} \end{bmatrix} \quad (9)$$

From this equation (9), the position vectors $[x_m \ y_m \ H_0]$ on the frame memory can be expressed as follows:

$$x_m = b_{11}x_s + b_{21}y_s + b_{31}$$

$$y_m = b_{12}x_s + b_{22}y_s + b_{32}$$

$$H_0 = b_{13}x_s + b_{23}y_s + b_{33} \quad (10)$$

In the case of transforming the homogeneous coordinate position vectors $[x_m \ y_m \ H_0]$ on the frame memory thus obtained to the 2-D position vectors $[X_M \ Y_M]$ on the frame memory, the following procedure will be recommended. More specifically, since the parameter "$H_0$" used when transforming the 2-D position vectors $[X_M \ Y_M]$ to the homogeneous coordinate system is the parameter to show the magnitude of the position vectors $[x_m \ y_m]$ of the homogeneous coordinate system, in order to transform the position vector of the homogeneous coordinate system to the 2-D position vector, parameters "$x_m$" and "$y_m$" to show the direction of the position vector of the homogeneous coordinate system may be normalized by the parameter "$H_0$" to show the magnitude of the homogeneous coordinate position vector. Thus, each parameter "$X_M$" and "$Y_M$" of the 2-D position vector on the frame memory can be obtained by the following equation:

$$X_M = x_m/H_0$$

$$Y_M = y_m/H_0 \quad (11)$$

In the case of transforming the homogeneous position vectors $[x_s \ y_s \ 1]$ on the monitor screen to the 2-D position vectors $[X_s \ Y_s]$, the same theorem can be applied and parameters "$x_s$" and "$y_s$" showing the direction of the homogeneous coordinate position vector may be normalized by the parameter "1" showing the magnitude of the homogeneous coordinate position vector. Thus, each parameter "$X_s$" and "$Y_s$" of the 2-D position vector on the monitor screen can be obtained by the following equation:

$$X_s = x_s$$

$$Y_s = y_s \quad (12)$$

Thus, by substituting the equations (10) and (12) into the equation (11), each parameter "$X_M$" and "$Y_M$" of the 2-D position vector on the frame memory can be expressed as shown in the following equations:

$$X_M = \frac{x_m}{H_0} = \frac{b_{11}x_s + b_{21}y_s + b_{31}}{b_{13}x_s + b_{23}y_s + b_{33}} = \frac{b_{11}X_s + b_{21}Y_s + b_{31}}{b_{13}X_s + b_{23}Y_s + b_{33}} \quad (13)$$

$$Y_M = \frac{y_m}{H_0} = \frac{b_{12}x_s + b_{22}y_s + b_{32}}{b_{13}x_s + b_{23}y_s + b_{33}} = \frac{b_{12}X_s + b_{22}Y_s + b_{32}}{b_{13}X_s + b_{23}Y_s + b_{33}} \quad (14)$$

And as well as the position vectors $[X_M \ Y_M]$ on the frame memory can be obtained by these equations (13) and (14), the read address $(X_M, Y_M)$ on the frame memory can be obtained.

Then, each parameter of the inverse matrix $T_{33}^{-1}$ to be used in the equations (13) and (14) will be obtained. In utilizing each parameter $a_1$–$a_{33}$ of the transformation matrix $T_{33}$, each parameter $b_{11}$–$b_{33}$ of the inverse matrix $T_{33}^{-1}$ can be expressed as shown in the following equations:

$$b_{11} = \frac{-a_{32}a_{23} + a_{22}a_{33}}{W_1} \quad (15)$$

$$b_{12} = \frac{a_{32}a_{13} - a_{12}a_{33}}{W_1} \quad (16)$$

$$b_{13} = \frac{-a_{22}a_{13} + a_{12}a_{23}}{W_1} \quad (17)$$

$$b_{21} = \frac{a_{31}a_{23} - a_{21}a_{33}}{W_1} \quad (18)$$

$$b_{22} = \frac{-a_{32}a_{13} + a_{11}a_{33}}{W_1} \quad (19)$$

$$b_{23} = \frac{a_{21}a_{13} - a_{11}a_{23}}{W_1} \quad (20)$$

$$b_{31} = \frac{-a_{22}a_{31} + a_{21}a_{32}}{W_1} \quad (21)$$

$$b_{32} = \frac{a_{12}a_{31} - a_{11}a_{32}}{W_1} \quad (22)$$

$$b_{33} = \frac{-a_{12}a_{21} + a_{11}a_{22}}{W_1} \quad (23)$$

Provided that the parameter $W_1$ is the value shown in the following equation:

$$W_1 = -a_{22}a_{31}a_{13} + a_{21}a_{32}a_{13} + a_{12}a_{31}a_{23} - a_{11}a_{32}a_{23} - a_{12}a_{21}a_{33} + a_{11}a_{22}a_{33} \quad (24)$$

Here, the value of each parameter $a_{11}$–$a_{33}$ will be expressed by the following equations from the equation (7).

$$a_{11} = r_{11}, \ a_{12} = r_{12}, \ a_{13} = r_{13}P_z \quad (25)$$

$$a_{21} = r_{21}, \ a_{22} = r_{22}, \ a_{23} = r_{23}P_z \quad (26)$$

$$a_{31} = 1_x, \ a_{32} = 1_y, \ a_{33} = 1_zP_z + s \quad (27)$$

By substituting these equations (25)–(27) into the equations (15)–(24), the equations (15)–(24) can be transformed to the following equations:

$$b_{11} = \frac{-1_y r_{23}P_z + r_{22}(1_zP_z + s)}{W_1} \quad (28)$$

-continued $$b_{12} = \frac{1_y r_{13} P_z + r_{12}(1_z P_z + s)}{W_1} \quad (29)$$

$$b_{13} = \frac{-r_{22} r_{13} P_z + r_{12} r_{23} P_z}{W_1} \quad (30)$$

$$b_{21} = \frac{1_x r_{23} P_z - r_{21}(1_z P_z + s)}{W_1} \quad (31)$$

$$b_{22} = \frac{-1_x r_{13} P_z + r_{11}(1_z P_z + s)}{W_1} \quad (32)$$

$$b_{23} = \frac{r_{21} r_{13} P_z - r_{11} r_{23} P_z}{W_1} \quad (33)$$

$$b_{31} = \frac{-r_{22} 1_x + r_{21} 1_y}{W_1} \quad (34)$$

$$b_{32} = \frac{r_{12} 1_x - r_{11} 1_y}{W_1} \quad (35)$$

$$b_{33} = \frac{-r_{12} r_{21} + r_{11} r_{22}}{W_1} \quad (36)$$

$$W_1 = -r_{22} 1_x r_{13} P_z + r_{21} 1_y r_{13} P_z + r_{12} 1_x r_{23} P_z - r_{11} 1_y r_{23} P_z - r_{12} r_{21}(1_z P_z + s) + r_{11} r_{22}(1_z P_z + s) \quad (37)$$

Then, by substituting the equations (28)–(37) into the equations (13) and (14), the read address $(X_M, Y_M)$ of the frame memory can be obtained by the following equations:

$$X_M = \frac{1}{H_0}[\{-1_x r_{23} P_z + r_{22}(1_z P_z + s)\} X_s + \{1_y r_{13} P_z + r_{12}(1_z P_z + s)\} Y_s + (-r_{22} r_{13} P_z + r_{12} r_{23} P_z)] \quad (38)$$

$$Y_M = \frac{1}{H_0}[\{1_x r_{23} P_z - r_{21}(1_z P_z + s)\} X_s + \{-1_y + r_{11}(1_z P_z + s)\} Y + (r_{21} r_{13} P_z - r_{11} r_{23} P_z)] \quad (39)$$

And by substituting the equations (34)–(36) into the equation (10), the parameter $H_0$ can be expressed by the following equation:

$$H_0 = (-r_{22} 1_x + r_{21} 1_y) X_s + (r_{12} 1_x - r_{11} 1_y) Y_s + (-r_{12} r_{21} + r_{11} r_{22}) \quad (40)$$

Thus, the read address $(X_M, Y_M)$ of the frame memory can be expressed using each parameter ($r_{11}$–$r_{33}$, $1_x$, $1_y$, $1_z$, s and $P_z$) of the transformation matrix $T_{33}$. Accordingly, if the screen address $(X_s, Y_s)$ will be supplied from the equation (38) to the equation (40) per pixel in order to correspond in the raster scanning order of the monitor screen, the read address $(X_M, Y_M)$ on the frame memory corresponding to the screen address supplied can be sequentially obtained.

(3-3) Calculation Method of Transformation Matrix $T_{33}$

As described above, if each parameter of the transformation Matrix $T_{33}$ can be found, the read address $(X_M, Y_M)$ of the frame memory can be obtained utilizing the equations (38)–(40). At this point, the calculation method of each parameter of this transformation matrix $T_{33}$ will be explained.

The position vector on the frame memory and the position vector on the monitor screen are related as shown in the equation (5) as described above. Accordingly, by substituting the actual value of the position vector into this equation (5), each parameter of the transformation matrix $T_{33}$ can be obtained.

As the position vector on the monitor screen, the position vector of 4 corners A, B, C, D of the quadrangle ABCD detected by the corner detector 9 will be used. Moreover, as the position vector on the frame memory, the position vector of 4 corners I, J, K, L of the selected image area IJKL specified by the operator will be used. As described above, since the address signal S2 on the 4 corner display coordinates of the selected image area IJKL will be sent out from the controller 18, the position vector on the memory of 4 corners of the selected image area IJKL will be calculated on the basis of that address signal S2 and this will be used as the position vector of corners I, J, K, L.

Firstly, let the position vectors of 4 corners A, B, C, D of the quadrangle ABCD to be $[X_1\ Y_1]$, $[X_2\ Y_2]$, $[X_3\ Y_3]$, $[X_4\ Y_4]$ in order and the position vectors of 4 corners I, J, K, L of the selected image area IJKL specified by the operator to be $[X'_1\ Y'_1]$, $[X'_2\ Y'_2]$, $[X'_3\ Y'_3]$, $[X'_4\ Y'_4]$. And as these position vectors are expressed by the homogeneous coordinate system respectively, the position vectors of 4 corners A, B, C, D can be expressed by the following equation:

$$[X_i K_i\ Y_i K_i\ K_i] i=1-4 \quad (41)$$

And the position vectors of 4 corners I, J, K, L can be expressed by the following equation:

$$[X'_i\ Y'_i\ 1] i=1-4 \quad (42)$$

By substituting the position vectors of the homogeneous coordinate system into the equation (5) respectively, the following equation will be obtained:

$$[X_i K_i\ Y_i K_i\ K_i] = [X'_i\ Y'_i\ 1] \cdot T_{33} \quad (43)$$

Here, the transformation matrix $T_{33}$ is defined as shown in the following equation:

$$T_{33} = \begin{bmatrix} a_{11} & a_{12} & a_{13} \\ a_{21} & a_{22} & a_{23} \\ a_{31} & a_{32} & a_{33} \end{bmatrix} \quad (44)$$

And the equation (43) can be transformed as shown in the following equation:

$$[X_i \cdot K_i\ \ Y_i \cdot K_i\ \ K_i] = [X'_i\ Y'_i\ 1] \cdot \begin{bmatrix} a_{11} & a_{12} & a_{13} \\ a_{21} & a_{22} & a_{23} \\ a_{31} & a_{32} & a_{33} \end{bmatrix} \quad (45)$$

And by expanding this equation (45), the following equation will be obtained:

$$[X_i \cdot K_i\ \ Y_i \cdot K_i\ \ K_i] = [a_{11} X'_i + a_{21} Y'_i + a_{31} \quad (46)$$
$$a_{12} X'_i + a_{22} Y'_i + a_{32}$$
$$a_{13} X'_i + a_{23} Y'_i + a_{33}]$$

And regarding each parameter "$X_i$", "$Y_i$" and "$K_i$", the following equations can be obtained:

$$X_i K_i = a_{11} X'_i + a_{21} Y'_i + a_{31} \quad (47)$$

$$Y_i K_i = a_{12} X'_i + a_{22} Y'_i + a_{32} \quad (48)$$

$$K_i = a_{13} X'_i + a_{23} Y'_i + a_{33} \quad (49)$$

By substituting the equation (49) into the equations (47) and (48), equations on the parameters "$X_i$" and "$Y_i$" will be obtained as follows:

$$X_i = \frac{a_{11}X'_i + a_{21}Y'_i + a_{31}}{a_{13}X'_i + a_{23}Y'_i + a_{33}} \quad (50)$$

$$Y_i = \frac{a_{12}X'_i + a_{22}Y'_i + a_{32}}{a_{13}X'_i + a_{23}Y'_i + a_{33}} \quad (51)$$

At this point, dividing denominators and numerators of the right side of these equations (50) and (51) by the parameter "$a_{33}$", these equations become as follows:

$$X_i = \frac{a_{11}/a_{33} \cdot X'_i + a_{21}/a_{33} \cdot Y'_i + a_{31}/a_{33}}{a_{13}/a_{33} \cdot X'_i + a_{23}/a_{33} \cdot Y'_i + 1} \quad (52)$$

$$Y_i = \frac{a_{12}/a_{33} \cdot X'_i + a_{22}/a_{33} \cdot Y'_i + a_{32}/a_{33}}{a_{13}/a_{33} \cdot X'_i + a_{23}/a_{33} \cdot Y'_i + 1} \quad (53)$$

It is clear from the above equations that the values of parameters "$X_i$" and "$Y_i$" do not change if divided by the parameter "$a_{33}$". Accordingly, even though the transformation matrix $T_{33}$ is replaced with the transformation matrix $T_{33}'$ to be shown in the following equation, the equation (45) exists.

$$T'_{33} = \begin{bmatrix} a_{11}/a_{33} & a_{12}/a_{33} & a_{13}/a_{33} \\ a_{21}/a_{33} & a_{22}/a_{33} & a_{23}/a_{33} \\ a_{31}/a_{33} & a_{32}/a_{33} & 1 \end{bmatrix} = \begin{bmatrix} a'_{11} & a'_{12} & a'_{13} \\ a'_{21} & a'_{22} & a'_{23} \\ a'_{31} & a'_{32} & 1 \end{bmatrix} \quad (54)$$

That is, the following equation exists.

$$[X_i \cdot K_i \quad Y_i \cdot K_i \quad K_i] = [X'_i \quad Y'_i \quad 1] \cdot T'_{33} \quad (55)$$

$$= [X'_i \quad Y'_i \quad 1] \cdot \begin{bmatrix} a'_{11} & a'_{12} & a'_{13} \\ a'_{21} & a'_{22} & a'_{23} \\ a'_{31} & a'_{32} & 1 \end{bmatrix}$$

Expanding this equation (55) re i=1–4, 12 linear equations relating to "$a_{11}'$"–"$a_{33}'$" and "$K_1$"–"$K_4$" as shown in the following equations can be obtained.

$$X_1 \cdot K_1 = a_{11}X'_1 + a_{21}Y'_1 + a_{31}' \quad (56)$$

$$Y_1 \cdot K_1 = a_{12}X'_1 + a_{22}Y'_1 + a_{32}' \quad (57)$$

$$K_1 = a_{13}X'_1 + a_{23}Y'_1 + 1 \quad (58)$$

$$X_2 \cdot K_2 = a_{11}X'_2 + a_{21}Y'_2 + a_{31}' \quad (59)$$

$$Y_2 \cdot K_2 = a_{12}X'_2 + a_{22}Y'_2 + a_{32}' \quad (60)$$

$$K_2 = a_{13}X'_2 + a_{23}Y'_2 + 1 \quad (61)$$

$$X_3 \cdot K_3 = a_{11}X'_3 + a_{21}Y'_3 + a_{31}' \quad (62)$$

$$Y_3 \cdot K_3 = a_{12}X'_3 + a_{22}Y'_3 + a_{32}' \quad (63)$$

$$K_3 = a_{13}X'_3 + a_{23}Y'_3 1 \quad (64)$$

$$X_4 \cdot K_4 = a_{11}X'_4 + a_{21}Y'_4 + a_{31}' \quad (65)$$

$$Y_4 \cdot K_4 = a_{12}X'_4 + a_{22}Y'_4 + a_{32}' \quad (66)$$

$$K_4 = a_{13}X'_4 + a_{23}Y'_4 + 1 \quad (67)$$

Since this linear equation has 12 parameters, it can be solved. Accordingly, parameters "$a_{11}'$"–"$a_{33}'$" can be obtained and the transformation matrix $T_{33}$' can be obtained. In this connection, the transformation matrix $T_{33}$' can be obtained by multiplying by the parameter "$a_{33}$" for scaling up and down to be preset to the transformation matrix $T_{33}$' obtained.

(3-4) Generation Method of Conversion Address

The three-dimensional conversion address generator 11 forms conversion address to supply to the image converter 16 according to the procedure described above. More specifically, the 3-dimensional conversion address generator 11 sets the linear equation on each parameter of the transformation matrix $T_{33}$ described above based on the position vector of 4 corners of the quadrangle ABCD to be supplied as address signal S1 from the corner detector 9 and the position vector of 4 corners of the selected image area IJKL to be supplied as address signal S2 from the controller 18, and by solving that linear equation, obtains the transformation matrix $T_{33}$. Then the 3-dimensional conversion address generator 11 obtains the inverse matrix $T_{33}^{-1}$ using each parameter of the transformation matrix $T_{33}$ obtained, and obtains conversion address ($X_M$, $Y_M$) to be supplied to the image converter 16 based on each parameter of the inverse matrix $T_{33}^{-1}$ and screen address ($X_S$, $Y_S$) to be supplied from the screen address generator 22 as screen address signal S3, and supplies this conversion address to the image converter 20 as conversion address signal S4. More specifically, in practice, the procedure to obtain the inverse matrix $T_{33}^{-1}$ from the transformation matrix $T_{33}$ is omitted and instead, calculations of the equations (38)–(40) described above are conducted by utilizing each parameter of the transformation matrix $T_{33}$, and the conversion address ($X_M$, $Y_M$) will be obtained directly.

(4) Operation and Effects of the Embodiment

According to the foregoing construction, in this video signal processing device 1, a blue board 6 is set for as a target of insertion of the source video image in the background of a newscaster 4, and this blue board 6 is photographed with the newscaster 4 by the video camera 2 and studio video signal $V_{BK}$ is formed. This studio video signal $V_{BK}$ is supplied to the chroma key device and target key signal keyT showing the area having blue hue is formed. The corner detector 9, receiving this target key signal keyT, detects positions of 4 corners A, B, C, D of the quadrangle ABCD shown by the blue board 6 based on the target key signal keyT, and supplies the address signal S1 showing that positions to the 3-dimensional conversion address generator 11.

On the other hand, the source video signal $V_{in}$ which is formed reproduced by the video tape recorder 12 or photographed by the video camera 13 is supplied to the image converter 16 and sequentially written in the memory 16B provided in the image converter 16. Moreover, the source video signal $V_{in}$ is also supplied to the monitor 17 and displayed on this monitor 17. The operator who operates the video signal processing device 1 operates the input device 10 observing the source video signal $V_{in}$ to be displayed on this monitor 17 and specifies the range of selected image area IJKL to fit to the quadrangle ABCD of the studio video signal $V_{BK}$. This range specification information will be sent out to the controller 18 from the input device 10. The controller 18 detects positions of 4 corners I, J, K, L of the selected image area IJKL based on the range specification information and supplies the address signal S2 showing that positions to the 3-dimensional conversion address generator 11 and the self key generator 19.

The 3-dimensional conversion address generator 11 calculates conversion address for image converting the selected image area IJKL to the same shape as the quadrangle ABCD based on the address signal S1 showing the positions of 4 corners of the quadrangle ABCD supplied from the corner detector 9 and the address signal S2 showing the positions of 4 corners of the selected image area IJKL supplied from the controller 18. In the case of obtaining the conversion address, the 3-dimensional conversion address generator 11 firstly obtains the transformation matrix $T_{33}$ of the 3-dimensional image conversion processing based on the position vectors of 4 corners of the quadrangle ABCD and the position vectors of 4 corners of the selected image area IJKL. Then, the 3-dimensional address generator 11 obtains the inverse matrix $T_{33}^{-1}$ of the transformation matrix $T_{33}$ using each parameter of that transformation matrix $T_{33}$, and by conducting the calculation processing based on each parameter of this inverse matrix $T_{33}^{-1}$ and screen address $(X_s, Y_s)$ from the screen address generator 22, obtains conversion address sequentially and supplies this to the image converter 16 and the transducer 20 as conversion address signal S4.

The image converter 16 sequentially reads out the source video signal $V_{in}$ written in the memory 16B based on the conversion address signal S4. Thus, the source video signal $V_{out}$ which is 3-dimensional image conversion processed so that it can be inserted to the quadrangle ABCD of the studio video signal $V_{BK}$ will be formed.

Furthermore, the self key generator 19 receives the address signal S2 showing the positions of 4 corners I, J, K, L of the selected image area IJKL from the controller 18, and based on said address signal S2, it forms self key signal S5 in which the area corresponding to the shape of the selected image area IJKL is formed with the signal level "1" and the other areas are formed with the signal level "0". The transducer 20 writes this self key signal S5 in the memory and reads this out based on the conversion address signal S4 supplied from the 3-dimensional conversion address generator 11. Accordingly, the self key signal $K_{out}$ in which the area having the signal level "1" is transformed to the same shape as the quadrangle ABCD will be formed.

The mixer 8, upon switching the image converted source video signal $V_{out}$ and the studio video signal $V_{BK}$, sends it out. More specifically, when the signal level of the self key signal $K_{out}$ is "0", the studio video signal $V_{BK}$ is selected and sent out, and when the signal level of the self key signal $K_{out}$ is "1", the source video signal $V_{out}$ is selected and sent out. And thus, the composite video signal $V_{mix}$ in which the source video signal $V_{out}$ is inserted to the quadrangle ABCD of the studio video signal $V_{BK}$ will be formed.

Figure 12A:
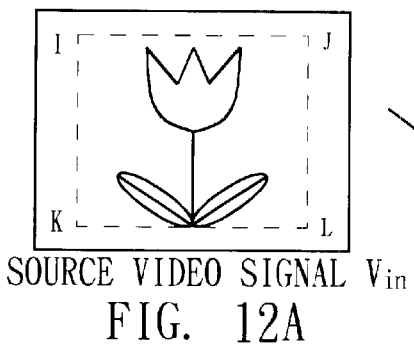
FIGS. 12A to 12C are brief linear diagrams showing images of each video signal during the process of inserting the source video signal $V_{in}$ to the studio video signal $V_{BK}$.
Figure 12B:
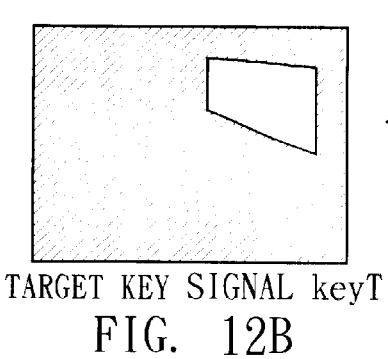
Figure 12C:
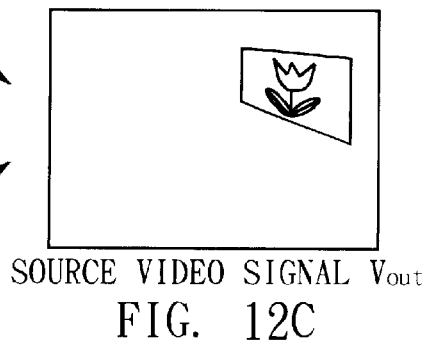
Figure 13A:
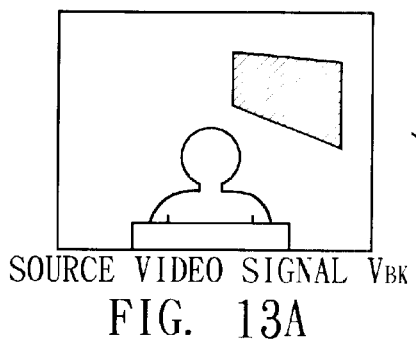
FIGS. 13A to 13C are brief linear diagrams showing images of each video signal during the process of inserting the source video signal $V_{in}$ to the studio video signal $V_{BK}$.
Figure 13B:
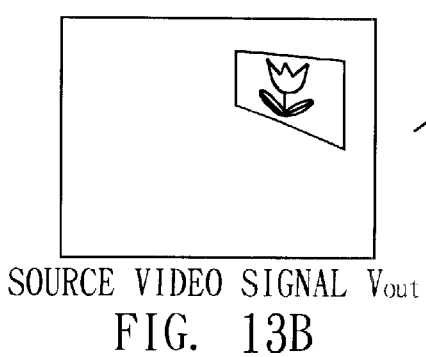
Figure 13C:
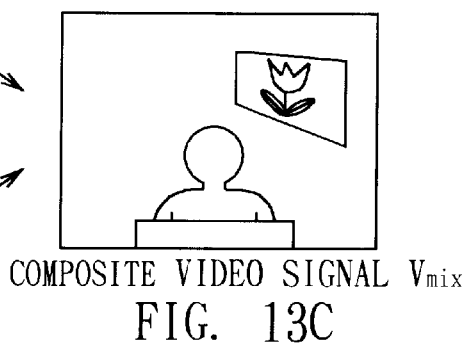

At this point images of each video signal will be shown in FIGS. 12 and 13. As shown in FIGS. 12A to 12C, of the source video signal $V_{in}$, the part specified as the selected image area IJKL will be image transformed based on the target key signal keyT showing the shape of the quadrangle ABCD and will be transformed to the shape of the quadrangle ABCD as shown in FIG. 12C. This transformed source video signal $V_{out}$ is combined to the quadrangle ABCD of the studio video signal $V_{BK}$ as shown in FIGS. 13A to 13C, and as a result, the composite video signal $V_{mix}$ in which the selected image area IJKL is inserted to the quadrangle ABCD will be formed.

With this arrangement, in this video signal processing device 1, the positions of 4 corners of the quadrangle ABCD is detected from the studio video signal $V_{BK}$, the transformation matrix $T_{33}$ for transforming the image is calculated based on the position information showing the position detected and the position information to show the 4-corner positions of the selected image area IJKL to be inserted, and by using each parameter of that transformation matrix $T_{33}$, the inverse matrix $T_{33}^{-1}$ of the transformation matrix $T_{33}$ is obtained, and based on each parameter of that inverse matrix $T_{33}^{-1}$ and the screen address, conversion address for image transformation is calculated, and the source video signal $V_{in}$ written in the memory 16B of the image converter 16 is read out based on that conversion address. Thus, the source video signal $V_{out}$ having the source video image that fits to the prescribed frame (ABCD) in the background of the newscaster 4 can be automatically formed without the operator's input of the parameter showing the shape after converted using such as the trackball as the conventional device. Accordingly, the operator has to conduct very simply operation just to specify the selected image area IJKL to be inserted to the studio video signal $V_{BK}$ (in case of inserting the overall source video signal $V_{in}$, this operation is not required), and the complicated manual adjustment to fit the source video image correctly to the prescribed frame (ABCD) as before becomes unnecessary and thus, manipulation of the operator can be further decreased than before.

According to the foregoing construction, since detecting 4 corner positions of the quadrangle ABCD into which the source video image is inserted from the studio video signal $V_{BK}$, calculating the transformation matrix $T_{33}$ for image conversion based on the position information to show the positions detected and the position information to show 4-corner positions of the selected image area IJKL to be inserted, by using each parameter of that transformation matrix $T_{33}$, the inverse matrix $T_{33}^{-1}$ of the transformation matrix $T_{33}$ is calculated, the conversion address for image conversion is calculated based on each parameter of that inverse matrix $T_{33}^{-1}$ and the screen address, and based on that conversion address, source video signal $V_{in}$ will be read out from the memory 16B, the source video signal $V_{out}$ which correctly fits to the quadrangle ABCD of the studio video signal $V_{BK}$ can be automatically formed. Thus, in the case of inserting the source video image into the prescribed frame ABCD in the background of the newscaster 4, the source video image can be automatically inserted to the blue board area without the operator's entering the parameter to show the condition after conversion. Accordingly, the operator's manipulation can be further decreased as compared with the conventional device and the operability can be further improved.

(5) Other Embodiments (5-1)

The embodiment described above has dealt with the case of displaying the source video signal $V_{in}$ on the monitor 17 and specifying the selected image area IJKL by observing the screen of the source video signal $V_{in}$ to be shown on this monitor 17. However, the present invention is not only limited to this but also providing only the monitor 21 on which the composite video signal $V_{mix}$ is displayed without providing the monitor 17, and if the selected image area IJKL would be specified by observing the screen of composite video signal $V_{mix}$ to be displayed on the monitor 21, the same effects as those of the embodiment described above can be obtained.

This specification method of the selected image area IJKL by observing the monitor 21 will be explained more specifically in the following paragraphs. The range specification information of the selected image area IJKL is set plus 100 percent and minus 100 percent in the horizontal direction from the center of the effective image area EFGH, and plus 100 percent and minus 100 percent in the vertical direction as the default value, and the whole area of the effective image area EFGH is specified as the selected image area IJKL. Accordingly, immediately after the video signal processing device 1 is started operating, the composite video signal $V_{mix}$ in which the effective image area EFGH is inserted into the prescribed frame ABCD in the background of the newscaster 4 will be displayed on the monitor 21.

The operator, observing the screen of the composite video signal $V_{mix}$ to be displayed on this monitor 21, operates the range specification volume and the keyboard and enters the range specification information for specifying the selected image area IJKL. For example, when the range specification information of the selected image area IJKL is sequentially converted by operating the range specification volume, the range of the selected image area IJKL displayed on the monitor 21 changes sequentially. The operator observes the change of the range of this selected image area IJKL, and when the desired range of the selected image area IJKL is displayed, stops input operation and fixes the range specification volume. Accordingly, the desired selective image area IJKL can be inserted to the prescribed frame ABCD in the background of the newscaster.

Furthermore, it is possible to input the value of the range specification information directly by using the keyboard instead of the range specification volume. In this case, for example, as the range specification information in the horizontal direction, if plus 80 percent and minus 80 percent from the center of the effective image area EFGH are put in, and as the range specification information in the vertical direction, if plus 80 percent and minus 80 percent from the center of the effective image area EFGH are put in, that range in the effective image area EFGH will be selected as the selected image area IJKL. Accordingly, the composite video signal $V_{mix}$ in which this selected image area IJKL is inserted into the prescribed frame ABCD in the background of the newscaster 4 is displayed on the monitor 21.

In this connection, in the case of conducting these range specifications, operation of the controller 18 is basically the same except there is no display control to the monitor 17. More specifically, the controller 18 detects positions of 4 corners of the selective image area IJKL based on the range specification information received from the input device 10 and outputs the address signal S2 to show that positions.
(5-2)

Figure 14:
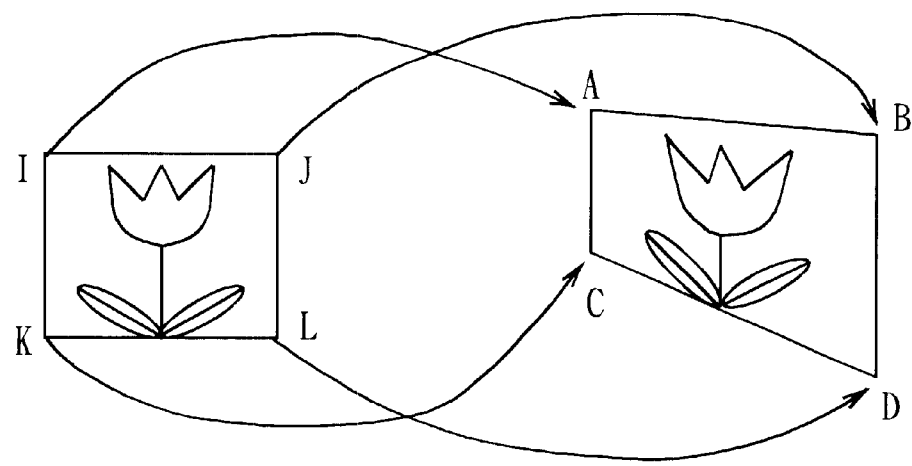
FIG. 14 is a brief linear diagram illustrating the case of inserting the selected image area IJKL to the quadrangle ABCD without rotating.

Furthermore, as shown in FIG. 14, the embodiment described above has dealt with the case of inserting the selected image area IJKL to the quadrangle ABCD in order that corners I, J, K, L of the selected image area IJKL correspond to corners A, B, C, D of the quadrangle ABCD respectively. However, the present invention is not only limited to this but also by shifting this correlation by 90-degree, the selected image area IJKL may be inserted changing its direction.

This insertion method after changing direction of the selected image area IJKL will be described in detail as follows: The operator enters direction information to show the relation between each corner of the selective image area IJKL and each corner of the quadrangle ABCD with the range specification information to specify the selected image area IJKL through the input device 10. As to this direction information, the angle of rotation to make the corners to correspond will be entered by rotating the selected image area IJKL. Let the clockwise direction of the rotation angle to be plus direction and the counter-clockwise direction to be minus direction.

For example, if plus 90-degree is entered as the direction information together with the range specification information from the input device 10, the controller 18 receives these information. And the controller 18 detects 4 corner positions of the selected image area IJKL based on the range specification information and sends out the direction information with the address signal S2 showing that positions to the 3-dimensional conversion address generator 11.

Figure 15:
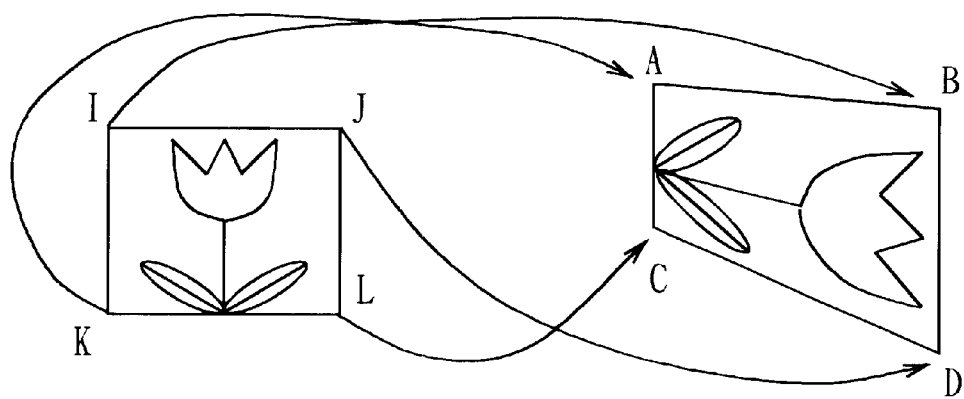
FIG. 15 is a brief linear diagram illustrating the case of fitting the selected image area IJKL to the quadrangle turning 90-degree in the clockwise.

The 3-dimensional conversion address generator 11 generates the conversion address which makes the selective image area IJKL to fit into the quadrangle BDAC (i.e., the conversion address which makes the selected image area IJKL to make a 90-degree turn to correspond) by an arithmetic operation based on the address signal S1 to show positions of 4 corners of the quadrangle ABCD supplied from the corner detector 9, the address signal S2 to show 4 corner positions of the selected image area IJKL supplied from the controller 18 and the direction information to show plus 90-degree, as shown in FIG. 15. Thus, by supplying this conversion address to the image converter 16 and the transducer 20 for key signal, the composite video signal $V_{mix}$ in which the selected image area IJKL is inserted in a state of 90-degree turn in the clockwise will be formed.

Figure 16:
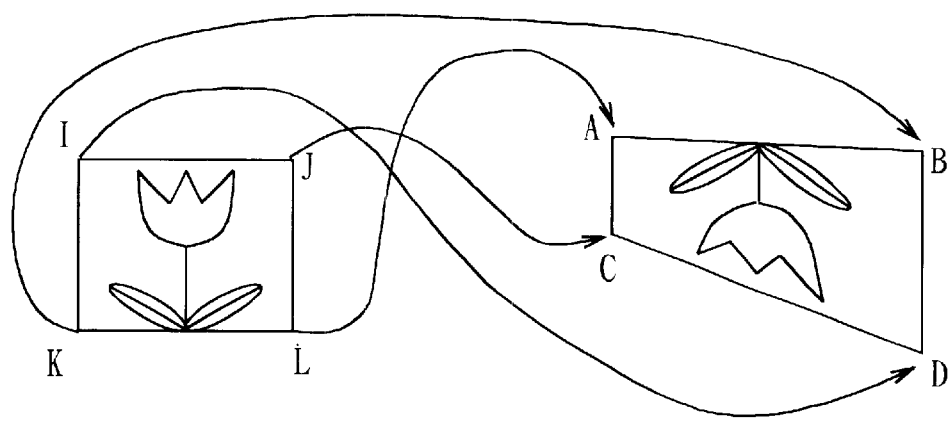
FIG. 16 is a brief linear diagram illustrating the case of fitting the selected image area IJKL into the quadrangle turning 180-degree in the clockwise.

Furthermore, in the case where the direction information showing plus 180-degree is entered as the direction information from the input device 10, the controller 18 supplies this direction information showing plus 180-degree to the 3-dimensional conversion address generator 11 with the address signal S2 showing positions of 4 corners of the selected image area IJKL. The 3-dimensional conversion address generator 11 forms conversion address so that the selected image area IJKL fits to the quadrangle DCBA based on the address signal S1 to show the positions of 4 corners of the quadrangle ABCD supplied from the corner detector 9, the address signal S2 to show positions of 4 corners of the selected image area IJKL supplied from the controller 18 and the direction information to show plus 180-degree by an arithmetic operation as shown in FIG. 16 (i.e., the conversion address that makes the selective image area IJKL to make 180-degree turn to correspond). Thus, by supplying this conversion address to the image converter 16 and the transducer 20 for key signal, the composite video signal $V_{mix}$ in which the selective image area IJKL is inserted in a state of 90-degree turn in the clockwise direction will be formed.

Figure 17:
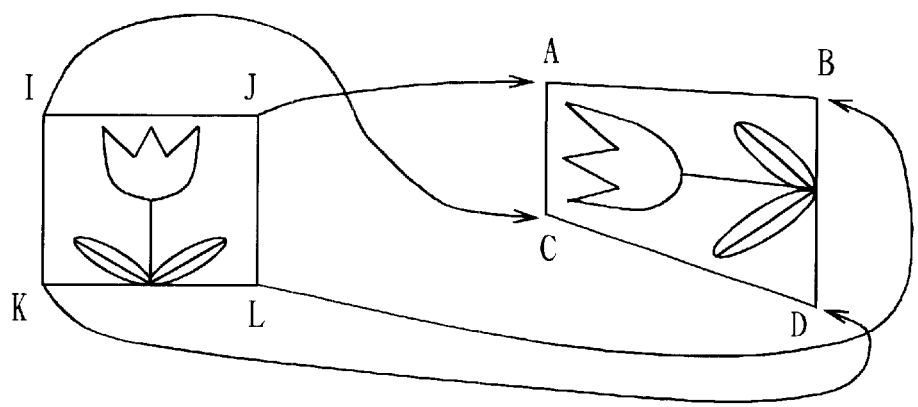
FIG. 17 is a brief linear diagram illustrating the case of fitting the selected image area IJKL into the quadrangle turning 270-degree in the clockwise.

Furthermore, in the case where the direction information showing plus 270-degree is entered as the direction information from the input device 10, the controller 18 supplies this direction information showing plus 270-degree together with the address signal S2 showing the positions of 4 corners of the selected image area IJKL to the 3-dimensional conversion address generator 11. The 3-dimensional conversion address generator 11, as shown in FIG. 17, forms the conversion address (i.e., the conversion address that makes the selective image area IJKL to make 270-degree turn to correspond) to fit into the quadrangle CADB of the selective image area IJKL by an arithmetic operation. Thus, by supplying this conversion address to the image converter 16 and the transducer 20 for key signal, the composite video signal $V_{mix}$ in which the selective image area IJKL is inserted in a state of 270-degree turn in the clockwise can be formed.
(5-3)

Figure 18:
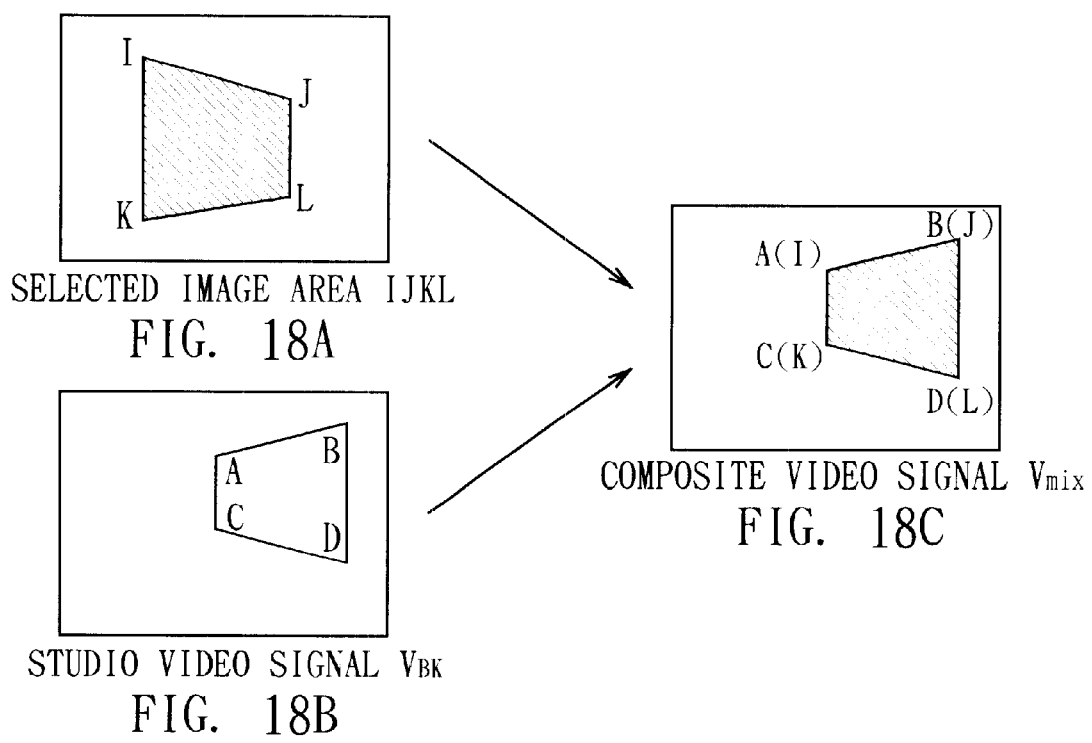
FIGS. 18A to 18C are brief linear diagrams illustrating the case of specifying an optional shape as the selected image area IJKL.

Moreover, the embodiment described above has dealt with the case of specifying rectangle or square selected image area IJKL by supplying the range specification information of horizontal and vertical direction. However, the present invention is not only limited to this but also the position of each corner I, J, K, L of the selected image area IJKL may be selected by using the input device 10, such as keyboard. With this arrangement, as shown in FIGS. 18A to 18C, the selected image area IJKL having an optional shape not simple rectangle or square form can be inserted to the quadrangle ABCD, thus the operability can be further improved.

(5-4)

Figure 19:
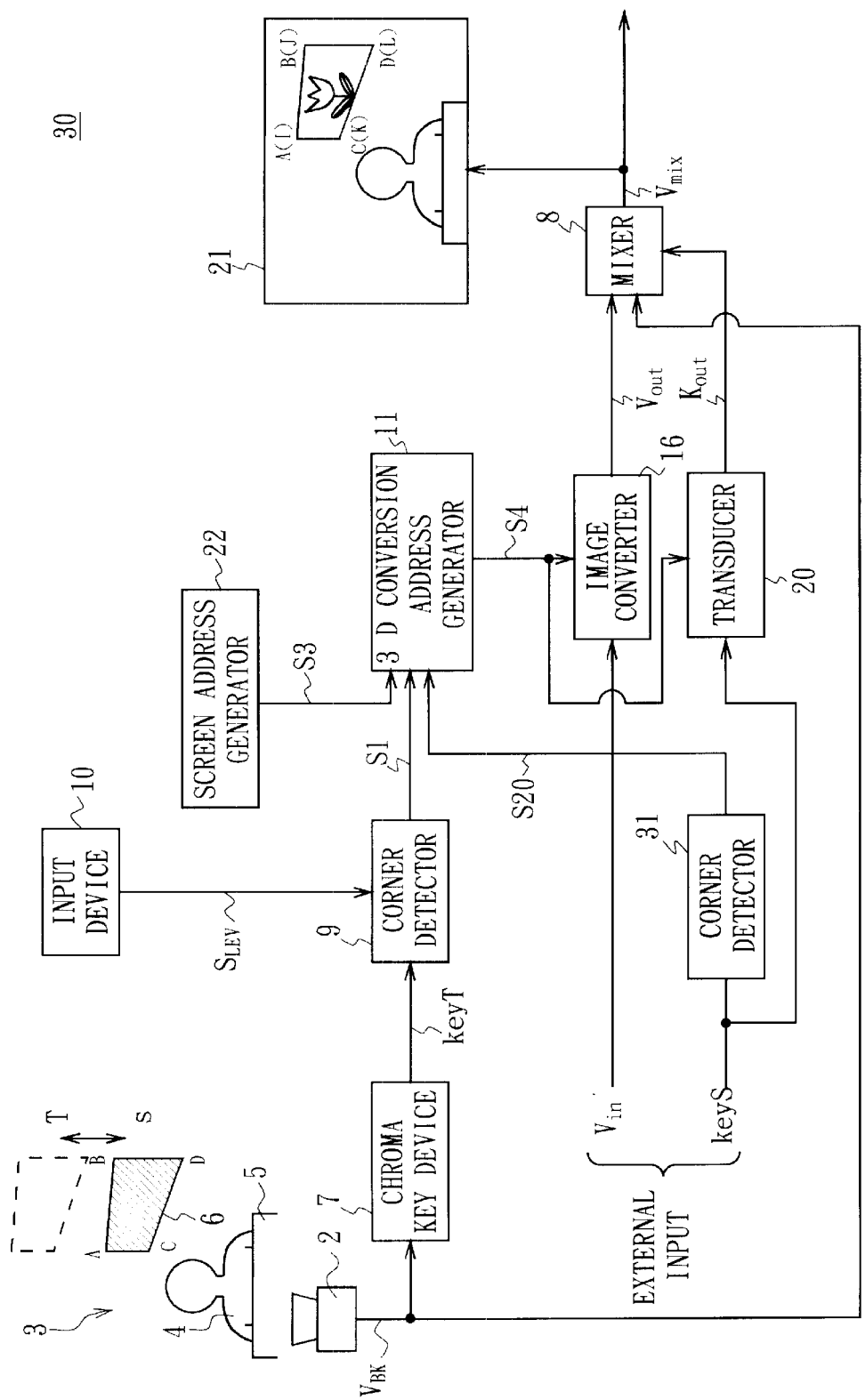
FIG. 19 is a block diagram showing the construction of a video signal processing device according to the other embodiment.

Furthermore, the embodiment described above has dealt with the case of generating the key signal (S5) to show the shape of source video image inside the video signal processing device 1. However, the present invention is not only limited to this but also key signal may be received from the external equipment. The construction of the video signal processing device 1 according to this case will be shown in FIG. 19, in which the corresponding parts of FIG. 1 are designated the same reference numerals.

In the case of this video signal processing device 30, the source video signal $V_{in}'$ in which the other image processing was provided by the external equipment (not shown in Fig.) will be entered. This source video signal $V_{in}'$ is supplied to the image converter 16 as in the case of video signal processing device 1 shown in FIG. 1 and successively written in the memory in the image converter 16. Moreover, in the case of this video signal processing device 30, key signal keyS formed in the external equipment with the source video signal $V_{in}'$ is entered. This key signal keyS is the signal to show the shape of an area to be inserted to the quadrangle ABCD as the source video image from among the source video signal $V_{in}'$ and the signal level becomes "1" in the area corresponding to the image area to be inserted and the signal level becomes "0" outside that area. This key signal keyS will be entered to the corner detector 31 and the transducer 20.

The corner detector 31 has the similar construction to that of the corner detector 9 to detect the corner of target key signal keyT and detects 4 corner positions of the key signal keyS, and supplies address signal S20 showing the 4 corner positions in the display coordinates to the 3-dimensional conversion address generator 11.

The 3-dimensional conversion address converter 11 calculates the transformation matrix to insert the source video signal $V_{in}'$ to the quadrangle ABCD based on the address signal S1 showing 4 corner positions of the quadrangle ABCD supplied from the corner detector 9 and the address signal S20 showing 4 corner positions of the key signal keyS supplied from the corner detector 31, and calculates the conversion address based on the inverse matrix of that transformation matrix and the screen address signal S3 from the screen address generator 22. More specifically, in the case of this video signal processing device 30, the conversion address will be obtained by using the position information of 4 corners of key signal keyS detected at the corner detector 31 in place of the position information of 4 corners of the selective image area IJKL.

The conversion address obtained will be supplied to the image converter 16 and the transducer 20 for key signal as conversion address signal S4. The image converter 16 forms source video signal $V_{out}$ image transformed by reading out the source video signal $V_{in}$ written in the inside memory based on the conversion address obtained by the conversion address signal S4. Similarly, the transducer 20, by reading out the key signal keyS written in the inside memory based on the conversion address to be obtained by the conversion address signal S4, forms key signal $K_{out}$ in which the area its signal level becomes "1" is transformed to the same shape as the quadrangle ABCD. Thus, in the mixer 8, by outputting the source video signal $V_{out}$ and the studio video signal $V_{BK}$ selectively based on this key signal $K_{out}$ the composite video signal $V_{mix}$ in which the source video signal $V_{in}'$ is inserted will be formed.

(5-5)

Furthermore, the embodiment described above has dealt with the case where the destination of source video image insertion was a quadrangle ABCD. However, the present invention is not only limited to this but also the destination of source video image insertion may be any polygon having more than 4 corners, because if there are more than 4 corners at least, each parameter of the transformation matrix $T_{33}$ can be calculated.

(5-6)

Moreover, according to the embodiment as described above, in the case of not inserting the source video signal $V_{in}$, the blue board 6 was removed by using an elevator. However, the present invention is not only limited to this but also the studio staff may remove the blue board 6.

According to the present invention as described above, the video signal processing device comprises address generation means for calculating a transformation matrix for three-dimensionally converting an image area of a source video signal to be inserted, into a blue plate area within a video signal based on the position information showing each corner position of the blue board area and the position information showing each corner position of the image area, and for calculating address information for reading the source video signal from a memory based on an inverse matrix of the transformation matrix, and image conversion means for reading the source video signal written in the memory based on the address information to form a conversion source video signal which has the image area 3-D converted and located at a position corresponding to the blue board area, thereby making it possible to three-dimensionally convert the image area to be inserted and to automatically insert the converted image area to the blue board, which is the destination of insertion, without requiring the operator to input parameters indicative of a state after transformed, with the result that the operator's operation can be significantly reduced as compared with the conventional image processing device. It is therefore possible to realize a video signal processing device and a video signal processing method which are capable of significantly decreasing the operator's operation as compared with the conventional image processing device.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A video signal processing device for inserting a source video signal to a prescribed area of a video signal and forming a composite video signal, comprising:

corner detection means for detecting a blue board area from the video signal obtained by photographing an object with the blue board in the background of said object and for detecting each corner position of said area;

source corner specifying means for specifying each corner position of an image area of said source video signal which is inserted to said blue board area of said video signal;

address generation means for calculating a transformation matrix for three-dimensionally transforming said image area to said blue board area on the basis of the position information showing each corner position of said blue board area detected by said corner detection means and the position information showing each corner position of said image area specified by said source corner specifying means, calculating an inverse matrix of said transformation matrix, and calculating address information for reading said source video signal from a memory in which said source video signal is written;

image conversion means for forming a conversion source video signal which is three-dimensionally image transformed and located at the position in which said image area corresponds to said blue board area by writing the source video signal in the memory and reading out the source video signal written in the memory based on the address information generated by said address generation means; and signal mixing means for forming a composite video signal in which an image area of said source video signal is inserted to said blue board area in said video signal by mixing said conversion source video signal and said video signal.

2. A video signal processing device according to claim 1, characterized by:

said transformation matrix is a matrix for mapping said image area in a three-dimensional space and further perspectively transforming it on a monitor screen.

3. A video signal processing device according to claim 1, characterized by:

said address generation means calculates the position vector of each corner of said image area on said memory on the basis of said position information from said source corner specifying means, and calculates said transformation matrix by setting a linear equation on each parameter of the transformation matrix based on the position vector of each corner of said image area and the position vector of each corner of said transformation matrix obtained by said position information from said corner detection means on a monitor screen and solving said linear equation.

4. A video signal processing device according to claim 3, characterized by:

said address generation means calculates an inverse matrix of said transformation matrix using the respective parameters of the calculated transformation matrix, and generates the address information for use in reading from said memory based on the respective parameters of said inverse matrix and addresses on the monitor screen generated in a raster scan order.

5. A video signal processing device according to claim 1, comprising:

input means for selecting said image area to be inserted to said blue board area in said video signal; and characterized by:

said source corner specifying means specifies each corner position of an image area selected by said input means, and forms said composite video signal which has said selected image area inserted to said blue board area of said video signal.

6. A video signal processing method for inserting a source video signal to a prescribed area of a video signal and forming a composite video signal, comprising:

a corner detection step for detecting a blue board area from the video signal which is obtained by photographing an object with a blue board in the background of said object and detecting each corner position of said blue board area;

a source corner specifying step for specifying each corner position of an image area of said source video signal to be inserted to said blue board area of said video signal;

an address generation step for calculating a transformation matrix for three-dimensionally transforming said image area to said blue board area based on the position information showing each corner position of said blue board area detected by said corner detection step and the position information showing each corner position of said image area specified by said source corner specifying step, successively calculating an inverse matrix of said transformation matrix, and calculating address information for reading said source video signal from a memory in which said source video signal has been written;

an image conversion step for forming a conversion source video signal which has a picture area three-dimensionally transformed and located at a position corresponding to said blue board area by writing said source video signal in said memory and reading said source video signal written in said memory based on said address information generated by said address generation step; and a signal mixing step for forming a composite video signal which has said image area of said source video signal inserted to said blue board area of said video signal by mixing said conversion source video signal and said video signal.

7. A video signal processing method according to claim 6, characterized by:

said transformation matrix is a matrix for mapping said image area to a three-dimensional space, and further perspectively transforming the mapped image area on a plane of a monitor screen.

8. A video signal processing method according to claim 7, characterized by:

said address generation step comprises calculating position vector of each corner of said image area on said memory based on said position information from said source corner specifying means; and setting a linear equation on each parameter of said transformation matrix based on the position vector of each corner of said image area and the position vector of each corner of said blue board area on the monitor screen, obtained by said position information from said corner detection step, and calculating said transformation matrix by solving said linear equation.

9. A video signal processing method according to claim 8, characterized by:

said address generation step calculates an inverse matrix of said transformation matrix using each parameter of the calculated transformation matrix, and generates the address information for use in reading from said memory based on each parameter of said inverse matrix and the address on the monitor screen generated in a raster scan order.

10. A video signal processing method according to claim 6, comprising:

an area selection step for selecting said image area to be inserted to said blue board area in said video signal; and characterized by:

said source corner specifying step specifies each corner position of the image area selected by said area selection step and forms said composite video signal which has said selected image area inserted to said blue board area of said video signal.

11. A video image processing device for conducting image processing on a source video image, comprising:

coordinate detection means for detecting coordinates of four corners of a first area specified in a first video image and coordinates of four corners of a second area specified in a second video image;

calculation means for calculating a three-dimensional transformation matrix for a three-dimensional image conversion from said coordinates of four corners of said first area and said coordinates of four corners of said second area in order to insert the video image of said second area into said first area by conducting three-dimensional image conversion on said second video image; and image conversion means for conducting three-dimensional conversion processing on said second video image by using the three-dimensional transformation matrix calculated by said calculation means in order that the video image of the second area 3-D converted is inserted into said first area.

12. A video image processing device according to claim 11, characterized by:

said three-dimensional transformation matrix can be expressed by a 4-row 4-column matrix composed of 8 transformation parameters as follows:

$$T'_{33} = \begin{bmatrix} a_{11}/a_{33} & a_{12}/a_{33} & a_{13}/a_{33} \\ a_{21}/a_{33} & a_{22}/a_{33} & a_{23}/a_{33} \\ a_{31}/a_{33} & a_{32}/a_{33} & 1 \end{bmatrix} = \begin{bmatrix} a'_{11} & a'_{12} & a'_{13} \\ a'_{21} & a'_{22} & a'_{23} \\ a'_{31} & a'_{32} & 1 \end{bmatrix}. \quad (68)$$

13. A video image processing device according to claim 12, characterized by:

said calculation means obtains said 8 parameter values by use of the following equation:

$$[X_i \cdot K_i \ \ Y_i \cdot K_i \ \ K_i] = [X'_i \ \ Y'_i \ \ 1] \cdot T'_{33} = [X'_i \ \ Y'_i \ \ 1] \cdot \begin{bmatrix} a'_{11} & a'_{12} & a'_{13} \\ a'_{21} & a'_{22} & a'_{23} \\ a'_{31} & a'_{32} & 1 \end{bmatrix}$$

where $(X_1, Y_1)$ $(X_2, Y_2)$ $(X_3, Y_3)$ $(X_4, Y_4)$ are the coordinates of four corners of the first area, $(X'_1, Y'_1)$ $(X'_2, Y'_2)$ $(X'_3, Y'_3)$ $(X'_4, Y'_4)$ are the coordinates of four corners of the second area, and $K_1, K_2, K_3, K_4$ are parameters of a homogeneous coordinate system.

14. A video image processing device according to claim 11, comprising:

chroma key detection means for detecting an area having the prescribed color of said first video image as said first area and forming a chroma key signal corresponding to said first area; and characterized by:

said coordinate detection means detects the coordinates of 4 corners of said first area on the basis of said chroma key signal.

15. A video image processing device according to claim 14, characterized by:

said image conversion means further conducts said three-dimensional conversion on said key signal corresponding to the second video image.

16. A video image processing device according to claim 15, comprising:

mixing means for mixing said first video image and said second video image 3-D converted on the basis of said key signal corresponding to the second video image.

17. A video image processing device according to claim 11, characterized by:

said image conversion means provides memory means to memorize said second video image and read address generation means to supply a read address which corresponds to said transformation matrix to said memory means.

18. A video image processing device according to claim 17, characterized by:

said read address generation means calculates said read address on the basis of the inverse matrix of said transformation matrix.

19. A video image processing method for conducting image processing on a source video image, comprising the steps of:

detecting coordinates of four corners of a first area specified in a first video image and coordinates of four corners of a second area specified in a second video image;

calculating a three-dimensional transformation matrix for conducting a three-dimensional image conversion from the coordinates of four corners of said first area and the coordinates of four corners of said second area in order that the video image of said second area is inserted into said first area by conducting the three-dimensional image conversion on said second video image; and conducting three-dimensional conversion processing on said second video image using said three-dimensional transformation matrix in order that the video image of the second area 3-D converted is inserted into said first area.

20. A video image processing method according to claim 19, further comprising:

detecting an area having a prescribed color of said first video image as said first area and forming a chroma key signal corresponding to said first area; and detecting the coordinates of four corners of said first area on the basis of said chroma key signal.

* * * * *